(12) United States Patent
Itoh

(10) Patent No.: US 8,612,429 B2
(45) Date of Patent: Dec. 17, 2013

(54) APPARATUS, SYSTEM, AND METHOD FOR INFORMATION SEARCH

(75) Inventor: Hideo Itoh, Machida (JP)

(73) Assignee: Ricoh Company, Limited, Tokyo (JP)

(*) Notice: Subject to any disclaimer, the term of this patent is extended or adjusted under 35 U.S.C. 154(b) by 515 days.

(21) Appl. No.: 12/354,229

(22) Filed: Jan. 15, 2009

(65) Prior Publication Data

US 2009/0187843 A1 Jul. 23, 2009

(30) Foreign Application Priority Data

Jan. 18, 2008 (JP) .................. 2008-009687

(51) Int. Cl.
G06F 17/30 (2006.01)

(52) U.S. Cl.
USPC .......................................... 707/728

(58) Field of Classification Search
USPC .......... 707/E17.004, E17.019, 915, 723, 728, 707/737
See application file for complete search history.

(56) References Cited

U.S. PATENT DOCUMENTS 6,363,375 B1 * 3/2002 Hoshino et al. ................. 1/1
7,441,182 B2 * 10/2008 Beilinson et al. ............. 715/229
2003/0227468 A1 * 12/2003 Takeda ......................... 345/619
2004/0111404 A1 6/2004 Mano et al.
2005/0065919 A1 3/2005 Gotoh et al.
2005/0182790 A1 * 8/2005 Gilbert et al. .............. 707/104.1
2005/0193008 A1 * 9/2005 Turner et al. ............... 707/104.1
2007/0174872 A1 * 7/2007 Jing et al. ....................... 725/46
2007/0236729 A1 * 10/2007 Yoda ........................... 358/1.15
2008/0168085 A1 * 7/2008 Chun et al. .................... 707/102
2008/0263036 A1 * 10/2008 Yamamoto ....................... 707/6
2009/0037477 A1 * 2/2009 Choi et al. ................. 707/104.1
2009/0064029 A1 3/2009 Corkran et al. ............... 715/781
2010/0241658 A1 * 9/2010 Rathurs et al. ............... 707/769

FOREIGN PATENT DOCUMENTS

JP 2005-92825 4/2005
JP 2007-233752 9/2007

* cited by examiner

Primary Examiner — James K. Trujillo
Assistant Examiner — Soheila Davanlou
(74) Attorney, Agent, or Firm — Oblon, Spivak, McClelland, Maier & Neustadt, L.L.P.

(57) ABSTRACT

An apparatus, system, and method of searching are disclosed. When a search result includes a plurality of images being obtained from the same document, the plurality of images being obtained from the same document is displayed, one by one, in the order determined based on priority order information.

18 Claims, 18 Drawing Sheets

FIG. 7

| ID | DOCUMENT NO. | FIG. NO. | CHARACTERISTIC VALUE |
|---|---|---|---|
| 001 | **-***a | 01 | * * * * * |
| 002 | **-***a | 02 | * * * * * |
| 003 | **-***a | 03 | * * * * * |
| ⋮ | | | |
| 011 | **-***b | 01 | * * * * * |
| 012 | **-***b | 02 | * * * * * |
| 013 | **-***b | 03 | * * * * * |
| ⋮ | | | |
| 021 | **-***c | 01 | * * * * * |
| 022 | **-***c | 02 | * * * * * |
| 023 | **-***c | 03 | * * * * * |
| ⋮ | | | |
| 101 | **-***d | 01 | * * * * * |
| 102 | **-***d | 02 | * * * * * |
| ⋮ | | | |

FIG. 8

| ID | IMAGE RELEVANCY VALUE | FIG. NO. | DOCUMENT NO. |
|---|---|---|---|
| 001 | ＊＊% | 01 | **-***a |
| 002 | ＊＊% | 02 | **-***a |
| 003 | ＊＊% | 03 | **-***a |
| ⋮ | | | |
| 011 | ＊＊% | 01 | **-***b |
| 012 | ＊＊% | 02 | **-***b |
| 013 | ＊＊% | 03 | **-***b |
| ⋮ | | | |
| 021 | ＊＊% | 01 | **-***c |
| 022 | ＊＊% | 02 | **-***c |
| 023 | ＊＊% | 03 | **-***c |
| ⋮ | | | |
| 101 | ＊＊% | 01 | **-***d |
| 102 | ＊＊% | 02 | **-***d |
| ⋮ | | | |

FIG. 9

| ID | DOCUMENT NO. | FIG. NO. | IMAGE RELEVANCY VALUE | ADDRESS | |
|---|---|---|---|---|---|
| 001 | **-*a | 001 | % | ¥¥jklm¥nopq¥a001.jpg | |
| 002 | **-*a | 002 | % | ¥¥jklm¥nopq¥a002.jpg | |
| 003 | **-*a | 003 | % | ¥¥jklm¥nopq¥a003.jpg | |
| 004 | **-*a | 004 | % | ¥¥jklm¥nopq¥a004.jpg | ... |
| 005 | **-*b | 001 | % | ¥¥jklm¥nopq¥b001.jpg | |
| 006 | **-*b | 002 | % | ¥¥jklm¥nopq¥b002.jpg | |
| 007 | **-*c | 001 | % | ¥¥jklm¥nopq¥c001.jpg | |
| ⋮ | | | | | |

FIG. 10

| DOCUMENT NO. | IMAGE RELEVANCY VALUE | 1 | 2 | 3 | |
|---|---|---|---|---|---|
| **-*a | % | 002 | 003 | 001 | |
| **-*b | % | 001 | 002 | | ... |
| **-*c | % | 001 | 003 | 002 | |
| **-*d | % | 002 | 004 | 001 | |
| ⋮ | | | | | |

FIG. 21

| ID | DOCUMENT NO. | CLAIM | IMAGE RELEVANCY VALUE | ADDRESS | |
|---|---|---|---|---|---|
| 001 | **-*a | 001 | % | ¥¥jklm¥nopq¥a001.jpg | |
| 002 | **-*a | 002 | % | ¥¥jklm¥nopq¥a002.jpg | |
| 003 | **-*a | 003 | % | ¥¥jklm¥nopq¥a003.jpg | |
| 004 | **-*a | 004 | % | ¥¥jklm¥nopq¥a004.jpg | ... |
| 005 | **-*b | 001 | % | ¥¥jklm¥nopq¥b001.jpg | |
| 006 | **-*b | 002 | % | ¥¥jklm¥nopq¥b002.jpg | |
| 007 | **-*c | 001 | % | ¥¥jklm¥nopq¥c001.jpg | |
| ⋮ | | | | | |

FIG. 22

| DOCUMENT NO. | DOCUMENT RELEVANCY VALUE | 1 | 2 | 3 | |
|---|---|---|---|---|---|
| **-*a | % | 002 | 003 | 001 | |
| **-*b | % | 001 | 002 | | ... |
| **-*c | % | 001 | 003 | 002 | |
| **-*d | % | 002 | 004 | 001 | |
| ⋮ | | | | | |

APPARATUS, SYSTEM, AND METHOD FOR INFORMATION SEARCH

CROSS-REFERENCE TO RELATED APPLICATIONS

This patent application is based on and claims priority under 35 U.S.C. §119 to Japanese Patent Application No. 2008-009687, filed on Jan. 18, 2008, in the Japanese Patent Office, the disclosure of which is hereby incorporated herein by reference.

FIELD OF THE INVENTION

The present invention generally relates to an apparatus, system, and method for information search, and more specifically to an apparatus, system, and method for searching an image using a search parameter.

BACKGROUND

An information search system allows a user to search various types of electronic data including electronic data generated in an image file format. In response to a search request input by the user, an image that matches the search request may be displayed to the user, for example, with information regarding a document from which the image is obtained. Using the information regarding the document, the user may access the document containing the displayed image, for example, when the user determines that the displayed image satisfies the user's need.

The above-described searching method may not be effective especially when more than one image is obtained from the same document, as the user may end up with accessing the same document more than once.

SUMMARY

Example embodiments of the present invention include an apparatus, system, and method of searching. When a search option input by a user is obtained, a search parameter is determined based on the search option. An image database is searched to obtain an image that matches the search parameter. A search result is generated, which includes image information identifying the image that matches the search parameter, image relevancy information indicating the degree of relevancy between the search parameter and the image, and document information identifying the document from which the image is obtained. When the image that matches the search parameter includes a plurality of images being obtained from the same document, the plurality of images being obtained from the same document is displayed, one by one, in the order determined based on priority order information.

In addition to the above-described example embodiments, the present invention may be practiced in various other ways, for example, as a recording medium storing a plurality of instructions that causes a processor to perform the above-described information search method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7 is an illustration for explaining an image list stored in the image database of FIG. 1, according to an example embodiment of the present invention;

FIG. 8 is an illustration for explaining an image relevancy list obtained by the information search apparatus of FIG. 1, according to an example embodiment of the present invention;

FIG. 9 is an illustration for explaining a selected image list obtained by the information search apparatus of FIG. 1, according to an example embodiment of the present invention;

FIG. 10 is an illustration for explaining an image order list obtained by the information search apparatus of FIG. 1, according to an example embodiment of the present invention;

FIG. 21 is an illustration for explaining a selected image list obtained by the information search apparatus of FIG. 1, according to an example embodiment of the present invention;

FIG. 22 is an illustration for explaining an image order list, obtained by the information search apparatus of FIG. 1, according to an example embodiment of the present invention.

Figure 1:
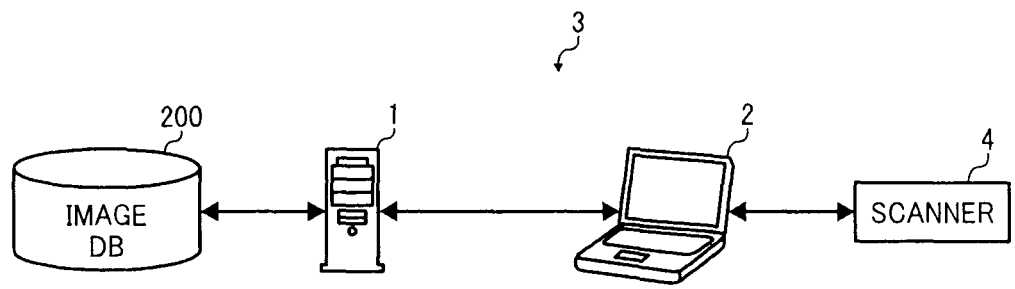
FIG. 1 is a schematic diagram illustrating a configuration of an information search system, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIG. 1, an information search system 3 is explained according to an example embodiment of the present invention. For the illustrative purpose, in the following examples, the information search system 3 searches one or more images in response to a search request sent by a user. As illustrated in FIG. 1, the information search system 3 includes an information search apparatus 1, a client apparatus 2, and an image database 200, which are connected through a network. The information search system 3 may be optionally provided with a scanner device 4, which may be connected to the network.

The client apparatus 2 may be implemented by any desired information processing apparatus such as a personal computer, portable computer, personal digital assistance (PDA) device, portable phone, digital camera, etc. As described below referring to FIG. 2, in this example, the client apparatus 2 is implemented by an information processing apparatus.

The information search apparatus 1 searches the image database 200 to obtain an image in response to a search request sent by the client apparatus 2 or input through the information search apparatus 1. As described below referring to FIG. 2, the information search apparatus 1 may be implemented by any desired information processing apparatus such as a personal computer. Alternatively, the information search apparatus 1 may be implemented by a multifunctional apparatus capable of performing a plurality of functions including the functions of copying, printing, faxing, and communicating via a network. Alternatively, the information search apparatus 1 may be implemented by any number of devices or apparatus together performing one or more operations or functions of the information search apparatus 1.

The image database 200 stores a plurality of images in the electronic format, each image being obtained from one of a plurality of documents subjected for searching. Further, the image database 200 may store information regarding the plurality of images, such as information that helps to identify each image. Such information regarding the image includes, but not limited to, information regarding the image characteristic value of the image, information regarding one or more terms contained in the image, identification information uniquely assigned to each image, address information that locates each image, etc.

Further, in this example, the image database 200 may be implemented by any number of servers each storing a collection of images obtained from one of a collection of documents subjected for searching. Alternatively, the image database 200 may be partially or entirely provided in the information search apparatus 1.

In addition to the plurality of images, the image database 200 may store a plurality of documents, in the electronic format, from which the plurality of images are obtained. Alternatively, a document database storing the plurality of documents may be provided on the network separately from the image database 200.

Further, the image database 200 may store information regarding a plurality of documents available for search as attribute information. In one example, the image database 200 may store information regarding a plurality of documents available on the network, such as metadata information indicating characteristics of each document. In another example, the image database 200 may store information regarding a plurality of documents available for use in the library, such as bibliographic information indicating characteristics of each document. In another example, the image database 200 may store information regarding a plurality of patent related documents, such as bibliographic information indicating characteristics of each patent related document. Alternatively, such information regarding a plurality of documents may be stored in the document database when the document database is provided on the network.

As described below, in one example, a set of images each including a specific portion of the same source document may be generated in any desired image file format. Examples of image file formats may include, but not limited to, raster graphics formats including JPEG, TIFF, RAW, PNG, GIF, BMP, etc. and vector graphics formats including CGM, SVG, PDF, etc. For example, it is assumed that a set of images is taken from the source document that is patent application document. In one example, a set of images may be generated for a set of drawings or figures obtained from one patent application document. In another example, a set of images may be generated for a set of claims obtained from one patent application document. In another example, a set of images may be generated for a set of sections obtained from one patent application document. The set of sections may include, for example, the abstract section, the title section, background section, summary section, drawings description section, and embodiment section. In another example, a set of images may be generated such that each image corresponds to each page obtained from one patent application document. In another example, a set of images may be generated such that each image corresponds to each paragraph obtained from one patent application document.

The scanner device 4 may be implemented by any kind of scanner capable of scanning a paper document into image data. As described below, the scanner device 4 may allow the user to input a search option in the form of paper document. When the search option is provided in the form of paper document, the scanner device 4 converts the paper document into electronic data, and inputs the electronic data to the information search apparatus 1 such that the information search apparatus 1 is capable of extracting information to be used as the search option from the electronic data. In alternative to the example case illustrated in FIG. 1, the function of the scanner device 4 may be incorporated into any device provided on the network such as the information search apparatus 1 or the client apparatus 2.

The network may include, for example, a local area network (LAN), the Internet, wired network, wireless network, etc.

Figure 2:
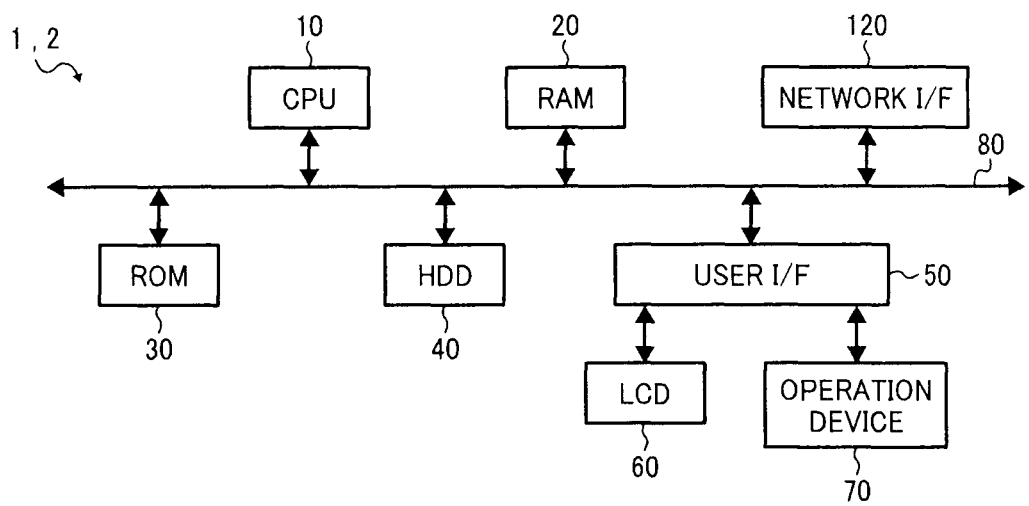
FIG. 2 is a schematic block diagram illustrating a hardware structure of each one of an information search apparatus and a client apparatus shown in FIG. 1, according to an example embodiment of the present invention.

Referring now to FIG. 2, a hardware structure of the information search apparatus 1 is explained according to an example embodiment of the present invention. The information search apparatus 1 includes a central processing unit (CPU) 10, a random access memory (RAM) 20, a read only memory (ROM) 30, a hard disk drive (HDD) 40, a user interface (I/F) 50, and a network interface (I/F) 120, which are connected via a bus 80. The information search apparatus 1 may be additionally provided with a liquid crystal display (LCD) 60 or an operation device 70, which is connected to the user I/F 50.

The CPU 10, which may be implemented by any desired processor such as a microprocessor, controls operation of the information search apparatus 1. The RAM 20, which may be implemented by a volatile memory, may function as a work area of the CPU 10. The ROM 30, which may be implemented by an involatile memory, may store various data such as firmware program. The HDD 40, which may be implemented by an involatile memory, may store various data such as an Operating System (OS), a control program, and an application program. The network I/F 120 allows the information search apparatus 1 to communicate with the outside apparatus through the network. The network I/F 120 may be implemented by, for example, the interface in compliance with Ethernet or USB. The user I/F 50 allows the user to interact with the information search apparatus 1 through the LCD 60 or the operation device 70. The LCD 60 displays various information to the user such as information regarding the status of the information search apparatus 1. The operation device 70, which may be implemented by a mouse or a keyboard, receives a user instruction from the user. In this example, the information search apparatus 1 functions as a server apparatus, which performs operation requested by the client apparatus 2. In such case, the user I/F 50, the LCD 60 or the operation device 70 may not be provided. Alternatively, the LCD 60 and the operation device 70 may be incorporated into one device such as a display device functioning as a touch panel.

In this example, an information search program may be stored in any desired memory such as the ROM 30, HDD 40, a storage device provided on the network, a recording medium, or any storage device that can be accessed by the information search apparatus 1. For example, when the information search apparatus 1 is activated, the information search program may be loaded onto the RAM 20, which causes the CPU 10 to perform operation according to the loaded information search program.

The client apparatus 2 of FIG. 1 may have a hardware structure substantially similar to the hardware structure of FIG. 2. In one example, a browser program such as a web browser program may be stored in any desired memory such as the ROM 30, HDD 40, a storage device provided on the network, a recording medium, or any storage device that can be accessed by the client apparatus 2. In such case, the browser program allows the user at the client apparatus 2 to input a user instruction such as a search request to be sent to the information search apparatus 1. Further, the browser program causes the client apparatus 2 to display information such as a search result received from the information search apparatus 1.

In another example, the information search program may be partially or entirely stored in any desired memory such as the ROM 30, HDD 40, or any storage device or medium that can be accessed by the client apparatus 2. In such case, the information search apparatus 1 and the client apparatus 2 may together perform operation of searching to generate a search result or operation of processing the search result. For example, the client apparatus 2 may be provided with a software component that causes the client apparatus 2 to perform operation of processing the search result received from the information search apparatus 1. The processing the search result includes, for example, changing the contents or view of the search result being displayed to the user.

Figure 3:
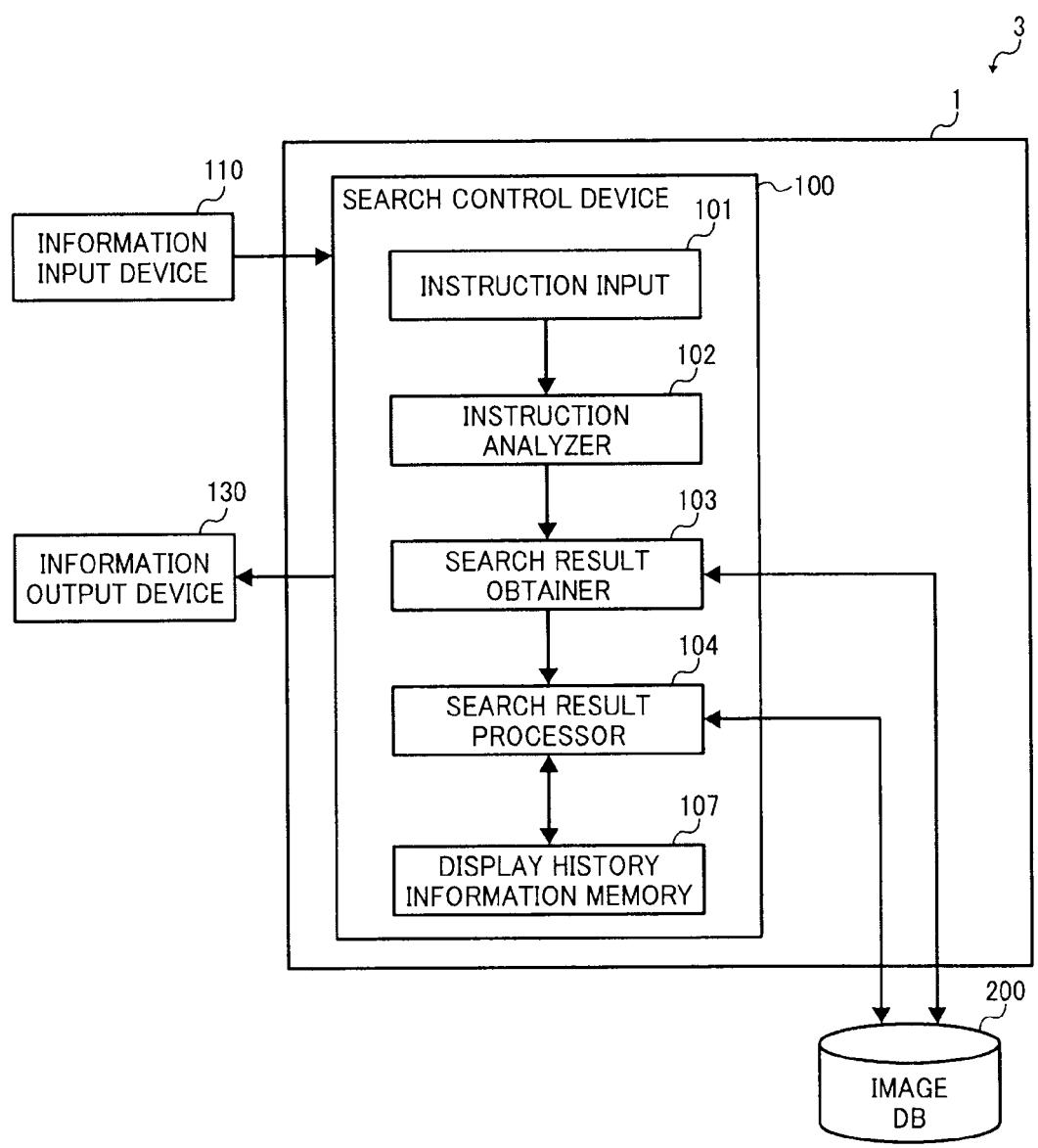
FIG. 3 is a schematic block diagram illustrating a functional structure of the information search system shown in FIG. 1, according to an example embodiment of the present invention.

Referring now to FIG. 3, a functional structure of the information search system 3 including the information search apparatus 1 is explained according to an example embodiment of the present invention. More specifically, upon loading the information search program, the information search apparatus 1 may be caused to function as a search control device 100. In addition to the search control device 100, the information search system 3 includes an information input device 110, an information output device 130, and the image database 200.

The information input device 110 allows the user to input a user instruction to the information search apparatus 1. Such function of the information input device 110 may be performed through the user I/F 50 or the operation device 70 (FIG. 2), which may be provided in the information search apparatus 1 or the client apparatus 2. Additionally, the information input device 110 may include the network I/F 120, for example, which allows the user instruction input by the user to be sent to the information search apparatus 1 when the information input device 110 is provided remote from the information search apparatus 1. Additionally or alternatively, the information input device 110 may be implemented by the scanner device 4, which may be optionally provided in the information search system 3 of FIG. 1.

The information output device 130 displays information such as the status of the information search apparatus 1 or a search result obtained by the information search apparatus 1. For example, such function of the information output device 130 may be performed through the user I/F 50 or the LCD 60 (FIG. 2), which may be provided in the information search apparatus 1 or the client apparatus 2. Alternatively, the information output device 130 may be implemented by any desired printer, for example, when the information search apparatus 1 or the information search system 3 is provided with a printer.

The search control device 100 controls operation of searching an image, performed by the information search apparatus 1 according to the information search program. The search control device 100 may include an instruction input 101, an instruction analyzer 102, a search result obtainer 103, a search result processor 104, and a display history information memory 107.

The instruction input 101 obtains a user instruction from a user through the information input device 110. In this example, the user instruction may include a search request that requests the information search apparatus 1 to perform search using a search option input by the user. The instruction analyzer 102 analyzes the user instruction received by the instruction input 101, and determines one or more search parameters to be used for searching, for example, based on the analysis of the search option input by the user.

For example, when the user inputs image data through the information input device 110 as the search option, the instruction analyzer 102 may analyze the characteristics of the image data to obtain an image characteristic value that represents the input image data, and determine a search parameter to be used for searching an image based on the image characteristic value.

In another example, when the user inputs text data through the information input device 110 as the search option, the instruction analyzer 102 may analyze the text data to obtain a search term that represents the input text data, and determine a search parameter to be used for searching an image based on the search term.

The search result obtainer 103 searches through the image database 200 to obtain a search result including information regarding one or more images that matches the search request sent by the user, using the search parameters obtained by the instruction analyzer 102 such as the image characteristic value or the search term determined by the instruction analyzer 102. The search result obtainer 103 may further obtain information regarding a document from which at least one image obtained as the search result is taken, as the search result. The search result obtainer 103 may store the search result being obtained in any desired memory such as the RAM 20 or the HDD 40.

The search result processor 104 may generate search result information based on the search result obtained by the search result obtainer 103 for output to the user, for example, through the information output device 130. For example, when the search result includes a plurality of images taken from the same document, the search result processor 104 may determine the priority order of the plurality of images, and cause the information output device 130 to display the plurality of images in the determined order.

Further, the search result processor 104 may change the view or contents of the search result being displayed through the information output device 130, for example, through a user instruction received through the information input device 110.

Alternatively, the search result processor 104 may change the view or contents of the search result being displayed based on display history information stored in the display history information memory 107. In this example, the display history information memory 107 may store display history information indicating whether any one of a plurality of images of the search result has been displayed through the information output device 130. The display history information memory 107 may be implemented by any desired memory or storage device, such as the RAM 20 or the HDD 40.

Figure 4:
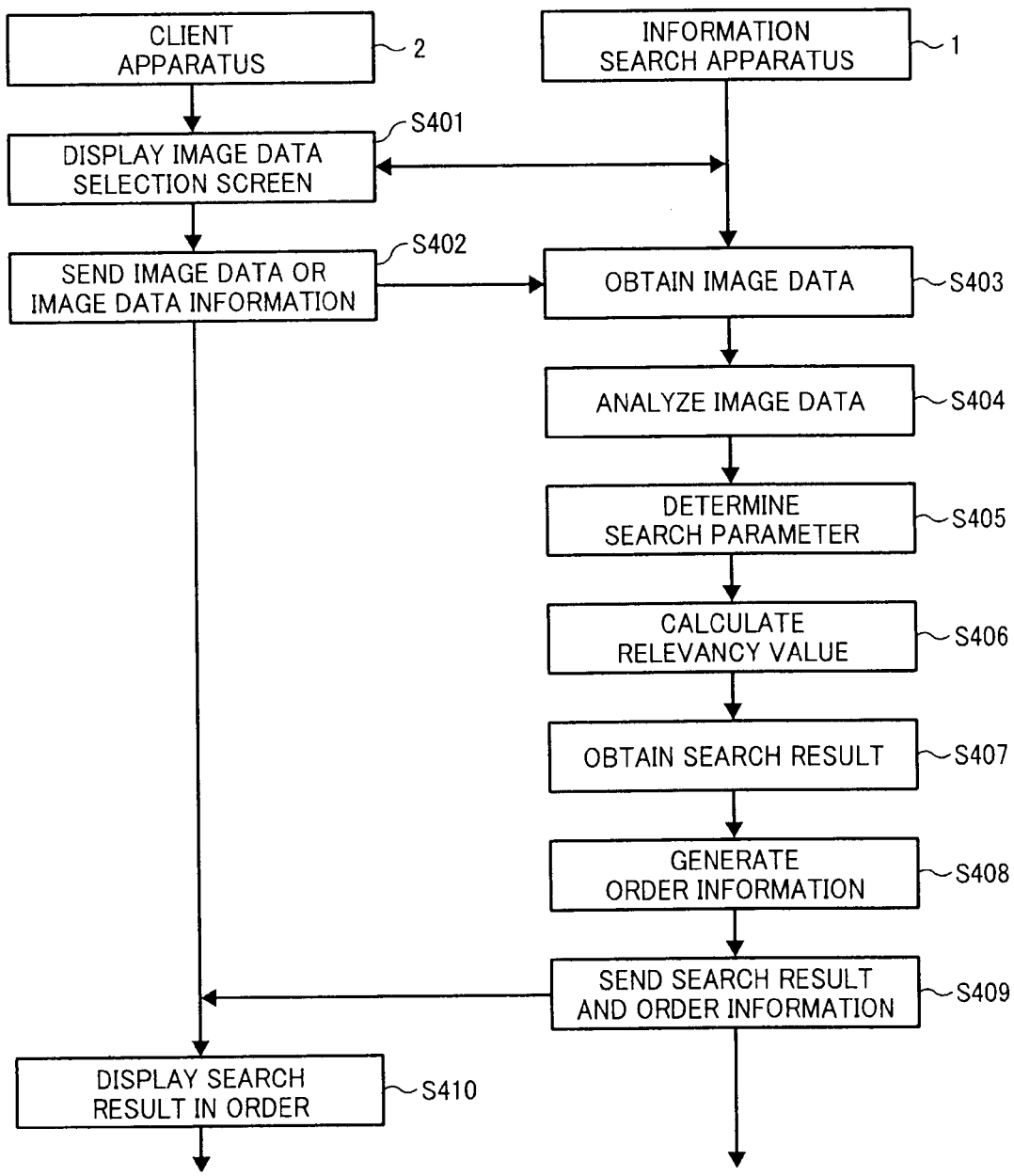
FIG. 4 is a data flow diagram illustrating operation of searching an image, performed by the information search system of FIG. 1, according to an example embodiment of the present invention.

Referring now to FIG. 4, operation of searching an image, performed by the information search system 3, is explained according to an example embodiment of the present invention. In this example, the user at the client apparatus 2 requests the information search apparatus 1 to search the image database 200 to obtain one or more images that matches the user's need. In this example, the user inputs a search option in the form of image data.

Further, for the illustrative purpose, it is assumed that the image database 200 stores a plurality of images that are each corresponding to the figures extracted from a plurality of patent application documents. Further, the plurality of images may be classified by the type of the source document data and further stored in different databases based on the classification. For example, the plurality of images may be classified by US patent documents, foreign patent documents, and design patent documents.

Further, the image database 200 may additionally store a plurality of documents including US patent documents that are published by the USPTO, foreign patent documents that are published, and design patent documents that are published by the USPTO. The foreign patent documents may include, for example, patent application documents published by the World Intellectual Property Organization (WIPO), European Patent Office (EPO), Japanese Patent Office (JPO), etc. The patent application documents may be classified by its type and further stored in different databases based on the classification.

At S401, when the client apparatus 2 receives a user instruction for searching, for example, through the browser program being installed on the client apparatus 2, the client apparatus 2 sends a request to the information search apparatus 1, which requests for information to be displayed to the user that allows the user to input a search option in the form of image data. When the request is received, the client apparatus 2 displays an image data selection screen that allows the user to input a search option in the form of image data.

Figure 5:
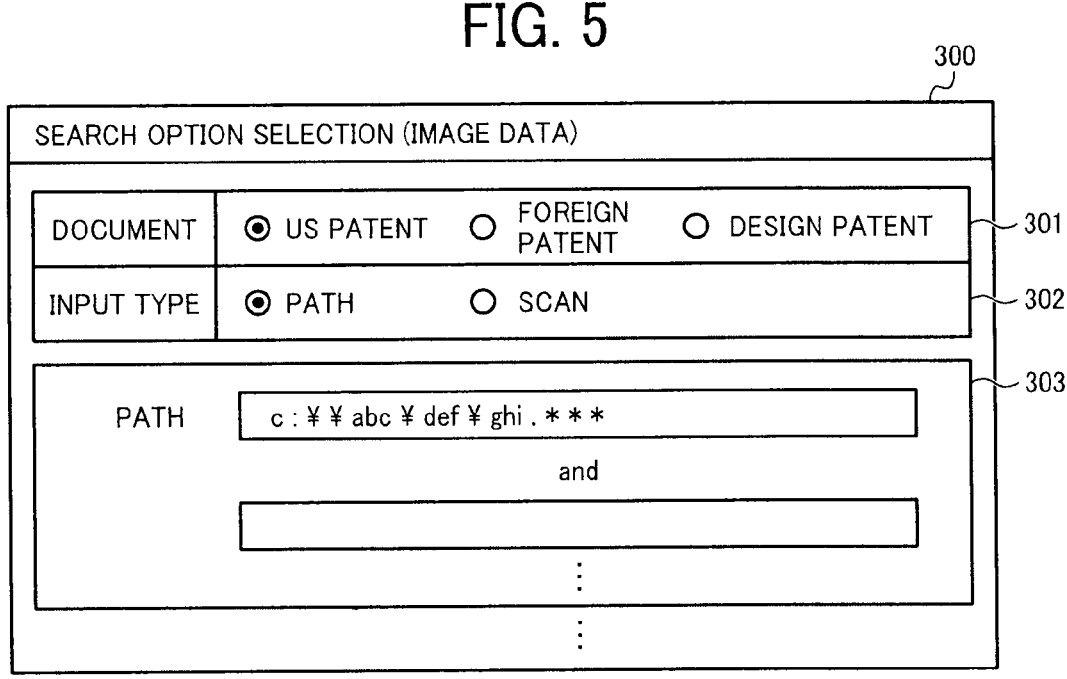
FIG. 5 is an illustration for explaining an image data selection screen, displayed by the client apparatus of FIG. 1, according to an example embodiment of the present invention.
Figure 6:
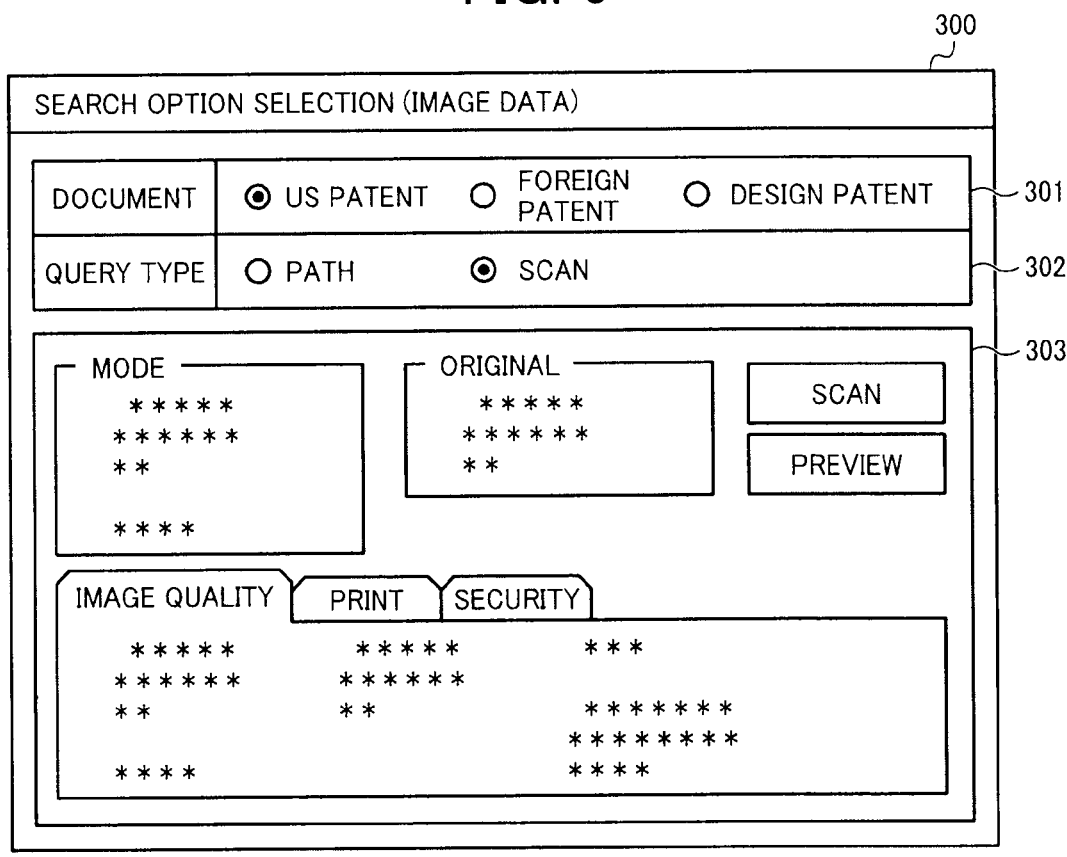
FIG. 6 is an illustration for explaining an image data selection screen, displayed by the client apparatus of FIG. 1, according to an example embodiment of the present invention.

For example, as illustrated in FIG. 5 or 6, the client apparatus 2 may display an image data selection screen 300 through the information output device 130. Referring to FIG. 5 or 6, the image data selection screen 300 includes a document selection section 301, a data input selection section 302, and a data input section 303. The document selection section 301 allows the user to specify the type of a collection of documents to be searched. In this example, the user is able to select at least one of the "US PATENT", "FOREIGN PATENT", and "DESIGN PATENT". The data input selection section 302 allows the user to specify the input type, or the means, for inputting the image data to be used for searching an image. In this example, the user is able to select one of the "PATH" and "SCAN" options. The data input section 303 allows the user to input information regarding the image data according to the selected input type of the data input selection section 302.

As illustrated in FIG. 5 or 6, the data input section 303 of the image data selection screen 300 may change depending on the selected input type of the data input selection section 302. For example, the data input section 303 of FIG. 5 corresponds to the example case in which the "PATH" option has been selected by the user as the data input type. In such case, the user may input path information regarding an address at which the image data to be used as the search option is stored. In this example, the image data to be used as the search option may be stored in any storage device or medium. As illustrated in FIG. 5, the user may select one or more files of image data as the search option.

In another example, the data input section 303 of FIG. 6 corresponds to the example case in which the "SCAN" option has been selected by the user as the data input type. In such case, the user may cause the scanner device 4 of FIG. 1 to scan an original image into image data to be used as the search option. Still referring to FIG. 6, the user may input various options relating to scanning such as the mode of scanning, image quality, etc., through the data input section 303.

Referring back to FIG. 4, at S402, the client apparatus 2 sends image data to be used as a search option ("the input image data" or "the input image") or information regarding the input image data to the information search apparatus 1. In the example case illustrated in FIG. 5, the client apparatus 2 may send path information input by the user through the information input device 110 to the information search apparatus 1 to cause the information search apparatus 1 to obtain the input image data using the path information. Alternatively, in the example case illustrated in FIG. 5, the client apparatus 2 may obtain the input image data using the path information input by the user, and send the input image data to the information search apparatus 1 as the search option through the network I/F 120. In the example case illustrated in FIG. 6, the client apparatus 2 may cause the scanner device 4 to send the input image data obtained by scanning to the information search apparatus 1. Alternatively, in the example case illustrated in FIG. 6, the client apparatus 2 may receive the input image data obtained by scanning from the scanner device 4, and send the input image data to the information search apparatus 1 as the search option through the network I/F 120.

At S403, the information search apparatus 1 obtains the input image data from the client apparatus 2 through the network I/F 120 or from any device using the input image data information. The instruction input 101 of the search control device 100 obtains the input image data as a user instruction, and sends the user instruction to the instruction analyzer 102.

At S404, the instruction analyzer 102 analyzes the user instruction, for example, to determine a search parameter to be used for searching an image. In this example, the instruction analyzer 102 analyzes the input image data obtained at S403 to obtain an image characteristic value that represents the characteristics of the input image data using any desired image characteristics extraction method. For example, the instruction analyzer 102 may detect the edges in the input image, generate a histogram describing the distribution of the edges in the input image, and calculate the image characteristic value using the histogram. In another example, the instruction analyzer 102 may detect a gradient vector representing a gradient of density of pixels in the input image, and calculate the image characteristic value based on the detected gradient vector. In another example, the instruction analyzer 102 may detect the texture in the input image, and calculate the image characteristic value based on the detected texture. Alternatively, any other information describing the image characteristics may be analyzed using pixel information obtainable from the pixels contained in the input image such as pixel color information or pixel depth information.

At S405, the instruction analyzer 102 determines search parameters to be used for searching an image, which include the image characteristic value obtained at S404. The instruction analyzer 102 sends information regarding the search parameters to the search result obtainer 103.

At S406, using the search parameters obtained from the instruction analyzer 102, the search result obtainer 103 searches the image database 200 to obtain one or more images that matches the search parameters. For example, for each image stored in the image database 200, the search result obtainer 103 may calculate the image relevancy value indicating the degree of relevancy, or similarity, with respect to the input image data by comparing between the image characteristic value obtained for each image subjected for searching and the image characteristic image obtained for the input image data.

In this example, as illustrated in FIG. 7, the image database 200 stores information regarding the plurality of images that are stored in the image database 200, for example, in the form of image list. Still referring to FIG. 7, the image list includes, for each image being stored in the image database 200, image identification information identifying the image such as an image ID number ("ID"), document information identifying the document containing the image such as a document number ("DOCUMENT NO"), figure number information regarding the number being assigned to the image contained in the document such as a figure number ("FIG NO"), and characteristic value information indicating the image characteristic value of the image ("CHARACTERISTIC VALUE"). The image characteristic value may be previously calculated using the image characteristics extraction method, which is used at S404 for the input image data. Alternatively, a plurality of image characteristic values may be stored, each corresponding to a different image characteristics extraction method. In such case, the search result obtainer 103 may select the image characteristic value that corresponds to the image characteristics extraction method used at S404.

For example, in order to calculate the image relevancy value for the image having the ID number of 001, the search result obtainer 103 may compare between the image characteristic value of the image "001" obtained from the image list of FIG. 7 and the image characteristic value of the input image data obtained at S404 using any desired comparison method to generate a comparison result. Based on the comparison result, the search result obtainer 103 may obtain the relevancy value indicating the degree of similarity between the image "001" and the input image. By performing this step for each image stored in the image database 200, the search result obtainer 103 may generate an image relevancy list of FIG. 8, which includes image relevancy information indicating the image relevancy value of each image with respect the input image ("IMAGE RELEVACY VALUE"). As illustrated in FIG. 8, the image relevancy value may be expressed in percentage, with the image relevancy value of 0% indicating that there is no similarity between the input image and the image subjected for searching and the image relevancy value of 100% indicating that the input image and the image subjected for searching are identical or substantially the same. In alternative to generating the image relevancy list of FIG. 8, the search result obtainer 103 may add information regarding the image relevancy value to the image list of FIG. 7.

Referring back to FIG. 4, at S407, the search result obtainer 103 selects a predetermined number of images from the image relevancy list of FIG. 8 based on the image relevancy value, and obtains the selected images as a search result. In this example, the images each having the relevancy value higher than a threshold value are obtained as the search result. The threshold value may be previously determined, for example, based on the image characteristics extraction method used for obtaining the image characteristic value for each of the input image and the image subjected for searching. For example, the threshold value may be set to be any number higher than 0%. Further, in this example, information regarding the document from which at least one selected image is taken is obtained as the search result.

In this example, as illustrated in FIG. 9, the search result obtainer 103 may generate the search result in the form of selected image list. The selected image list includes, for each selected image, the image identification information such as the image ID number of the image, the document information such as the document number of the document from which the image is taken, the figure number information such as the figure number assigned to the image, the image relevancy information such as the image relevancy value of the image with respect to the input image, and address information indicating the location at which the image is stored such as path information. The search result obtainer 103 may send the search result to the search result processor 104.

Referring back to FIG. 4, at S408, the search result processor 104 determines whether more than one selected image has been obtained from the same document. For at least two images being obtained from the same image, the search result processor 104 determines the order of displaying each image based on the image relevancy value. For example, for each image contained in the same document, the search result processor 104 may generate priority order information indicating the priority order in displaying each image, and assign the priority order information to each image based on the image relevancy information of each image. In this example, the priority order information may be expressed in numerical value, with the lowest numerical value being assigned to the image to be displayed first and the highest numerical value being assigned to the image to be displayed last. In this example, the priority order of the value 1 is assigned to the image having the highest image relevancy value among a plurality of images contained in the same document. The priority order of the value 2 is assigned to the image having the second highest image relevancy value among the plurality of images contained in the same document. In this manner, all images in the document are assigned with the priority order having a specific value based on the image relevancy value.

Using the priority order information, the search result processor 104 may further generate an image order list of FIG. 10. Referring to FIG. 10, the image order list includes the document information such as the document number of the document including at least one selected image, document relevancy information indicating the document relevancy value of each document with respect to the input image ("DOCUMENT RELEVANCY VALUE"), and the figure number information such as the figure number being assigned to each image contained in the corresponding document. For each document, the figure numbers of the selected images are arranged in the order from the image having the highest priority order to the lowest priority order. Further, in this example, the document relevancy value for each document may be calculated based on the image relevancy information of at least one image contained in the document. For example, the image relevancy value of the image having the highest image relevancy value among a plurality of images contained in the same document may be used as the document relevancy value.

Alternatively, the document relevancy information may not be provided. In such case, the image order list of FIG. 10 may be formed as a matrix including a row vector having a plurality of matrix elements each representing the priority order information, and a column vector having a plurality of matrix elements each representing the document. Each cell of the matrix, which is provided at the intersection of the row and the column, includes the image identification information indicating the image contained in the corresponding document that is assigned with the corresponding priority order. The number of matrix elements representing the priority order information may be set to the total number of images contained in the document having the largest number of images.

Referring back to FIG. 4, at S409, the search result processor 104 sends the search result obtained at S407 to the client apparatus 2 through the network I/F 120 together with information regarding the priority order obtained at S408. In this example, the search result processor 104 sends the selected image list of FIG. 9 and the image order list of FIG. 10. Alternatively, the search result processor 104 may send a portion of the search result obtained at S407 and the information regarding the priority order obtained at S408. For example, the search result processor 104 may send information regarding the images being assigned with the priority order having the value "1", which are to be displayed first to the user.

Figure 11:
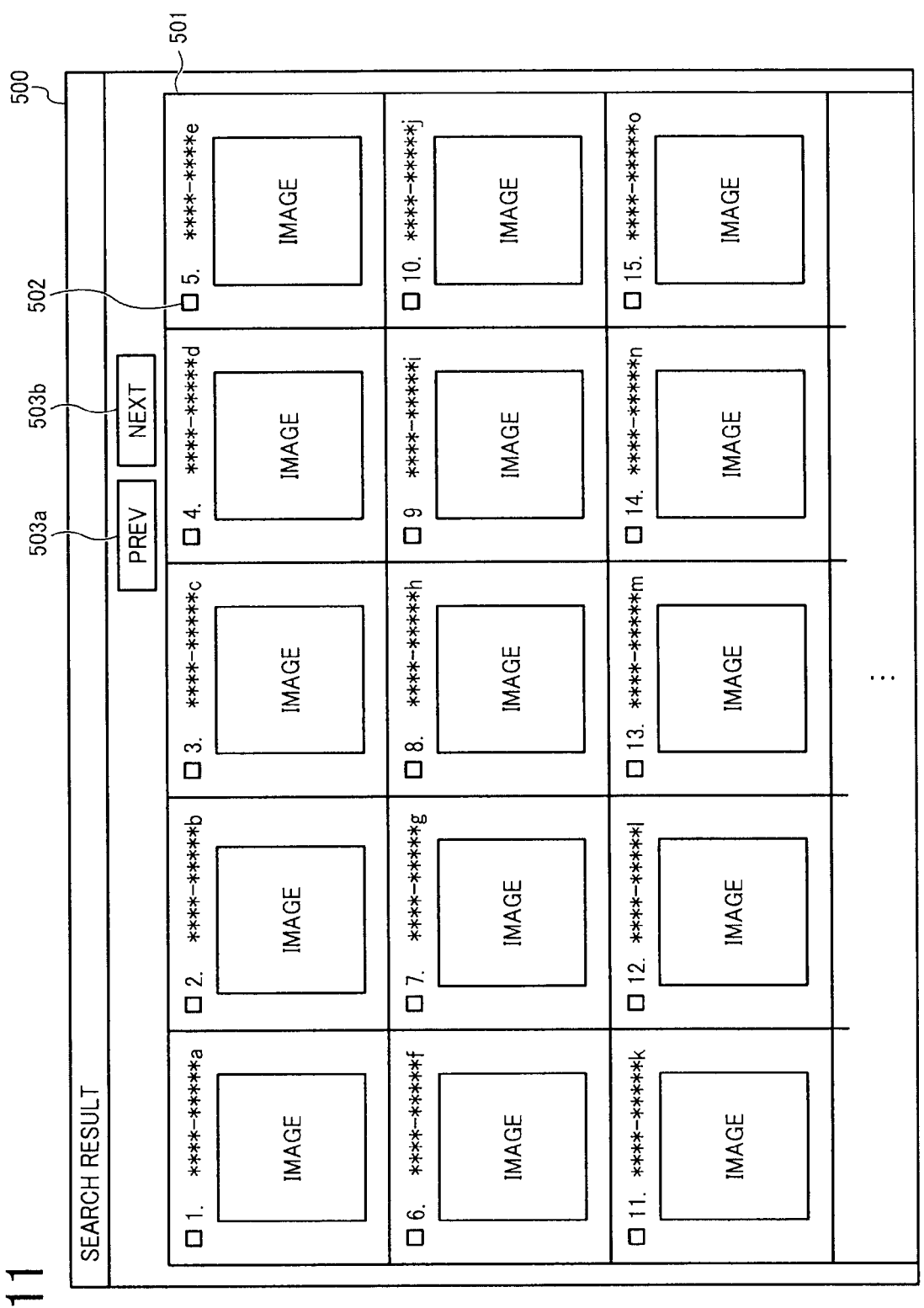
FIG. 11 is an illustration for explaining a search result screen, displayed by the client apparatus of FIG. 1, according to an example embodiment of the present invention.

At S410, the client apparatus 2 displays the search result in the order specified by the priority order information, and the operation ends. For example, the client apparatus 2 may display a search result screen 500 illustrated in FIG. 11. As illustrated in FIG. 11, the search result screen 500 displays a plurality of images, which are each obtained from different documents but assigned with the same value of the priority order information.

As described above referring to FIG. 4, when a plurality of images is obtained from the same document as a search result, the plurality of images are displayed, one screen by one screen, in the order determined based on priority order information. Since one image is displayed for one document, the user may be prevented from accessing the same document more than once.

Still referring to FIG. 11, the search result screen 500 of FIG. 11 includes a search result display section 501, a switch lock section 502, a display switch section 503 including a previous result display section 503a and a next result display section 503b.

The search result display section 501 displays the search result obtained by the information search apparatus 1 in response to the search request sent by the user. In this example, the search result display section 501 displays a plurality of images at once. The plurality of images being displayed at the same time are each obtained from different documents but assigned with the same value of the priority order information. For example, the client apparatus 2 obtains the image identification information such as the image ID for each image assigned with the priority order information having the value "1" from the image order list of FIG. 10, and further obtains the address information that matches the image identification information from the selected document list of FIG. 9. Using the address information, the client apparatus 2 obtains the image data from the storage device for display to the user. As the plurality of images are displayed in the order determined based on the image relevancy value, the user may easily recognize the image having the highest image relevancy value.

Further, in this example, the plurality of images are displayed in the order determined based on the document relevancy information of the corresponding document. In the example case illustrated in FIG. 11, the image provided at the upper left corner is the image taken from the document having the highest document relevancy value. In this manner, the user may easily recognize the document that contains the image having the highest image relevancy value.

For each image, the client apparatus 2 may display the document information of the corresponding document such as the document number, and the switch lock section 502. Further, the numerical value, such as the value "1", which represents the order determined by the document relevancy value may be displayed together with the document information such as the document number. Further, each document number may be hyperlinked to the corresponding document data.

The display switch section 503 allows the user to switch the contents of the search result display section 501. When the next result display section 503 is selected by the user, for example, through the information input device 110, the search result display section 501 displays a plurality of images each assigned with the priority order information that is ranked by one step lower than the priority order information that is assigned to each image currently displayed. For example, when the images each assigned with the priority order information of 1 are displayed, selection of the next result display section 503 causes the information output device 130 of the client apparatus 2 to display the images each assigned with the priority order information of 2.

When the previous result display section 503 is selected by the user, for example, through the information input device 110, the search result display section 501 displays a plurality of images each assigned with the priority order information that is ranked by one step higher than the arrangement order information that is assigned to each image currently displayed. For example, when the images each assigned with the arrangement order information of 2 are displayed, selection of the previous result display section 503 causes the information output device 130 of the client apparatus 2 to display the images each assigned with the priority order information of 1. In this manner, the plurality of images included in the search result may be displayed in the order determined by the priority order information, or the order determined based on the image relevancy value.

The switch lock section 502 allows the user to select the image currently displayed in the search result display section 501 to be in the locked state. For example, when the switch lock section 502 for the image provided at the upper left corner is selected by the user, for example, by checking the corresponding check box through the information input device 110, the search result display section 501 continues to display the image provided at the upper left corner even when the display switch section 503 is selected.

Figure 12:
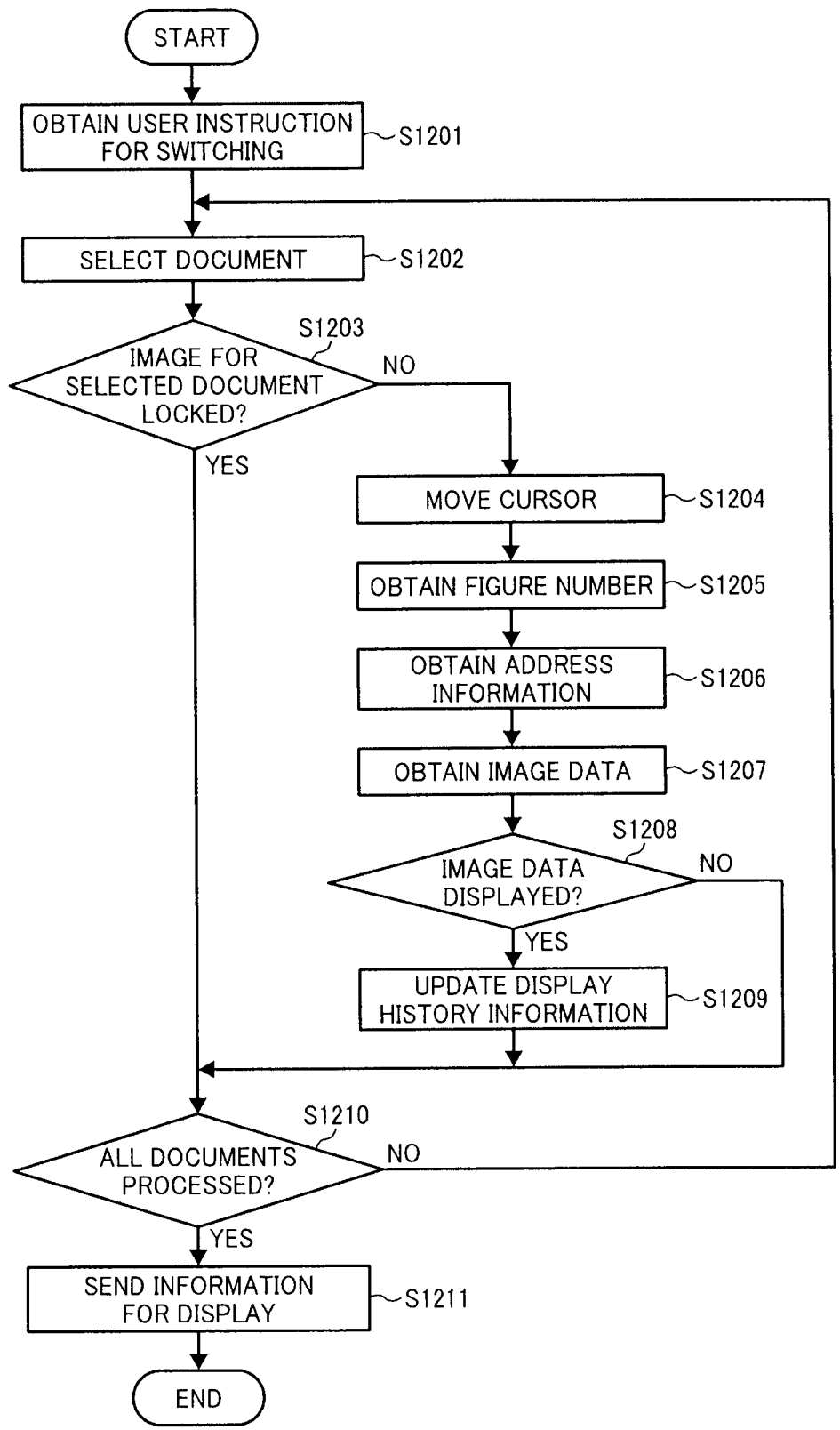
FIG. 12 is a flowchart illustrating operation of changing the display of a search result screen, according to an example embodiment of the present invention.

Referring now to FIG. 12, operation of changing the display of the search result display section 501 is explained according to an example embodiment of the present invention. The operation of FIG. 12 may be performed by the search result processor 104 according to a user instruction input through the client apparatus 2.

Figure 13A:
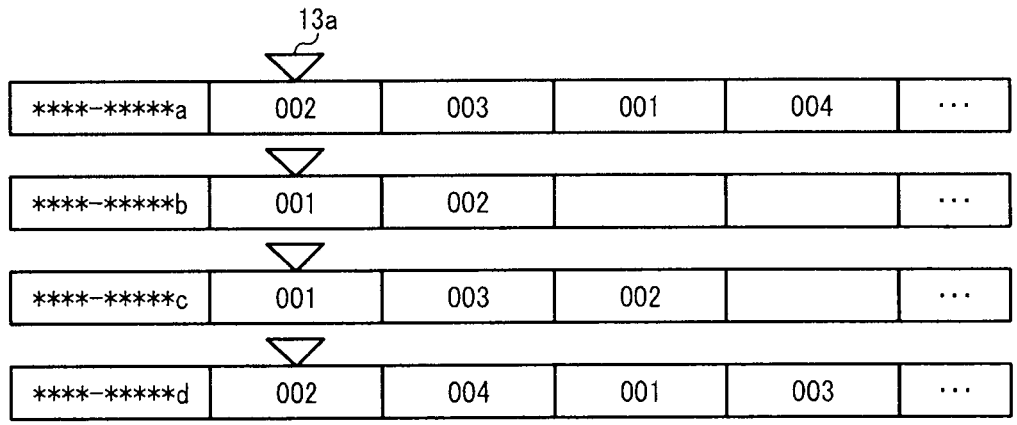
FIG. 13A is an illustration for explaining the position of a cursor when a search result screen is displayed, according to an example embodiment of the present invention.
Figure 13B:
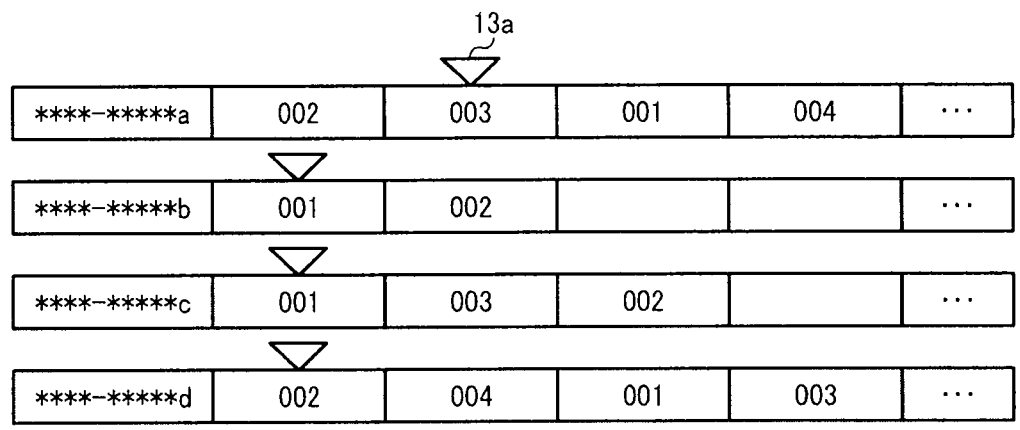
FIG. 13B is an illustration for explaining the position of a cursor when a search result screen is displayed, according to an example embodiment of the present invention.

Specifically, in this example, as illustrated in FIG. 13A, it is assumed that four documents are obtained as the search result. For each document, a plurality of images obtained from each document are arranged in the order determined by the priority order information, or the image relevancy value. For the document having the document number of "**-***a", the image having the figure number of 002, the image having the figure number of 003, the image having the figure number of 001, and the image having the figure number of 004 are arranged in the order from the image having the highest image relevancy value to the image having the lowest image relevancy value.

In this example, in response to the search request input by the user, the client apparatus 2 firstly displays the image 002 contained in the document "**-*a", the image 001 contained in the document "-*b", the image 001 contained in the document "-*c" and the image 002 contained in the document "-*d". Any one of the information search apparatus 1 and the client apparatus 2 may further manage a curser 13a that points a specific image in the searched document that is currently displayed. As illustrated in FIG. 13A, when the images 002, 001, 001, and 002 are displayed, the client apparatus 2 causes the cursors 13a** to respectively point the images 002, 001, 001, and 002.

When the user instruction for switching the display of the search result display section 501 is input through the display switch section 503, the client apparatus 2 may send the user instruction for switching to the information search apparatus 1. The user instruction for switching includes header information, and information indicating which one of the previous result display section 503a and the next result display section 503b is selected. The user instruction for switching may additionally include information regarding the images currently displayed such as information regarding the images pointed by the cursors 13a. The user instruction for switching may additionally include information whether the switch lock section 502 is selected for any one of the images currently displayed. In this example, it is assumed that the next result display section 503b is selected by the user.

When the user instruction for switching is received through the network I/F 120, at S1201, the user instruction is input to the search result processor 104.

At S1202, the search result processor 104 selects a document from a plurality of documents included in the search result, for example, using the image order list of FIG. 10. In this example, it is assumed that the document "**-***a" is selected.

At S1203, the search result processor 104 analyzes the user instruction for switching obtained at S1201 to determine whether the image currently displayed for the selected document is in the locked state based on information indicating the selection of the switch lock section 502. In this example, the search result obtainer 104 determines whether the image 002 of the document "**-*a" is in the locked state. When it is determined that the image of the selected document is in the locked state ("YES" at S1203), the operation proceeds to S1210. When it is determined that the image of the selected document is not in the locked state ("NO" at S1203), the operation proceeds to S1204**.

At S1204, the search result processor 104 causes the cursor 13a to move from the position corresponding to the currently displayed image of the selected document to a position corresponding to an image to be displayed next, according to the information indicating the selection of the display switch section 503. In this example, the search result processor 104 causes the cursor 13a to move from the position corresponding to the image 002 of the document "**-*a", to the position corresponding to the image 003 of the document "-***a".

At S1205, the search result processor 104 obtains the figure number information of the image to which the cursor 13a is pointed. In this example, the figure number of 003 is obtained.

At S1206, the search result processor 104 searches the selected document list of FIG. 9 using the obtained figure number as a key, and obtains address information indicating the location at which the image having the obtained figure number is stored. Referring to FIG. 9, in this example, the search result processor 104 obtains the address information ¥¥jklm¥nopq¥a003.jpg that corresponds to the image 003 of the document "**-***a".

At S1207, the search result processor 104 obtains the image data specified by the obtained figure number using the address information.

At S1208, the search result processor 104 may determine whether the image obtained at S1207 has been previously displayed, for example, by referring to display history information stored in the display history information memory 107. When it is determined that the display history information indicates that the obtained image has been previously displayed ("YES" at S1208), the operation proceeds to S1209. When it is determined that the display history information indicates that the obtained image has not been previously displayed ("NO" at S1208), the operation proceeds to S1210. For example, the display history information may be expressed in the flag value, with the flag value of 0 indicating that the image has not been displayed and the flag value of 1 indicating that the image has been displayed.

At S1209, the search result processor 104 updates the display history information stored in the display history information memory 107 for the image data obtained at S1207. For example, the value of flag may be set to be the value indicating that the image has been previously displayed.

At S1210, the search result processor 104 determines whether all documents included in the search result have been processed. When it is determined that all documents have been processed ("YES" at S1210), the operation proceeds to S1211. When it is determined that all documents have not been processed ("NO" at S1210), the operation returns to S1202 to select another document to be processed.

At S1211, the search result processor 104 may send information regarding a plurality of images to be displayed next to the user to the client apparatus 2, and the operation ends.

As described above referring to FIG. 12, the contents or view of the search result display section 501 may be switched according to the use instruction.

Figure 13C:
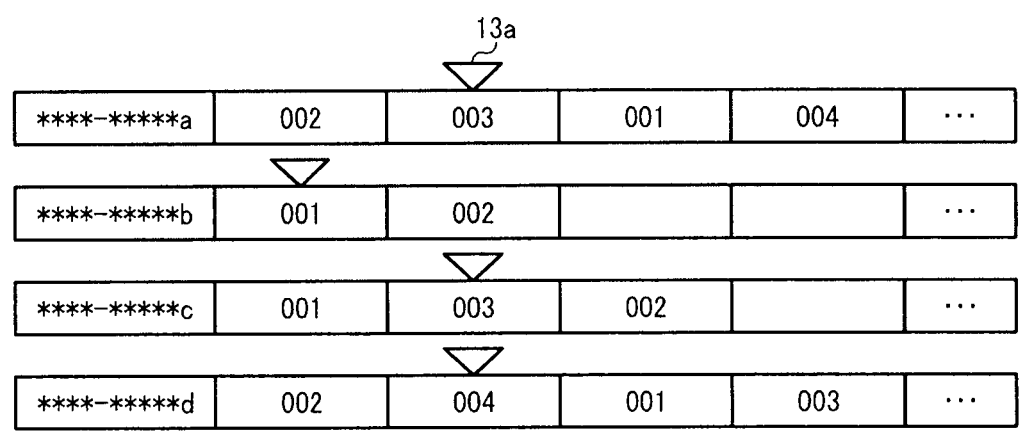
FIG. 13C is an illustration for explaining the position of a cursor when a search result screen is displayed, according to an example embodiment of the present invention.

In one example, the search result processor 104 may cause the client apparatus 2 to continuously display the image when the switch lock section 502 is selected for the image or the document containing the image. For example, it is assumed that, when four images are displayed as described above referring back to FIG. 13A, the user selects the image 001 of the document "**-***b" to be in the locked state through the switch lock section 502. In such case, as illustrated in FIG. 13C, the search result processor 104 does not move the cursor 13a for the image 001 while moving the cursors 13a for other images, even when the next result display section 503b is selected by the user. Accordingly, the image 001 continues to be displayed to the user, while other images are switched according to the movement of cursors 13a. With the switch lock section 502, the user may easily recognize the image that has been selected by the user.

Figure 14:
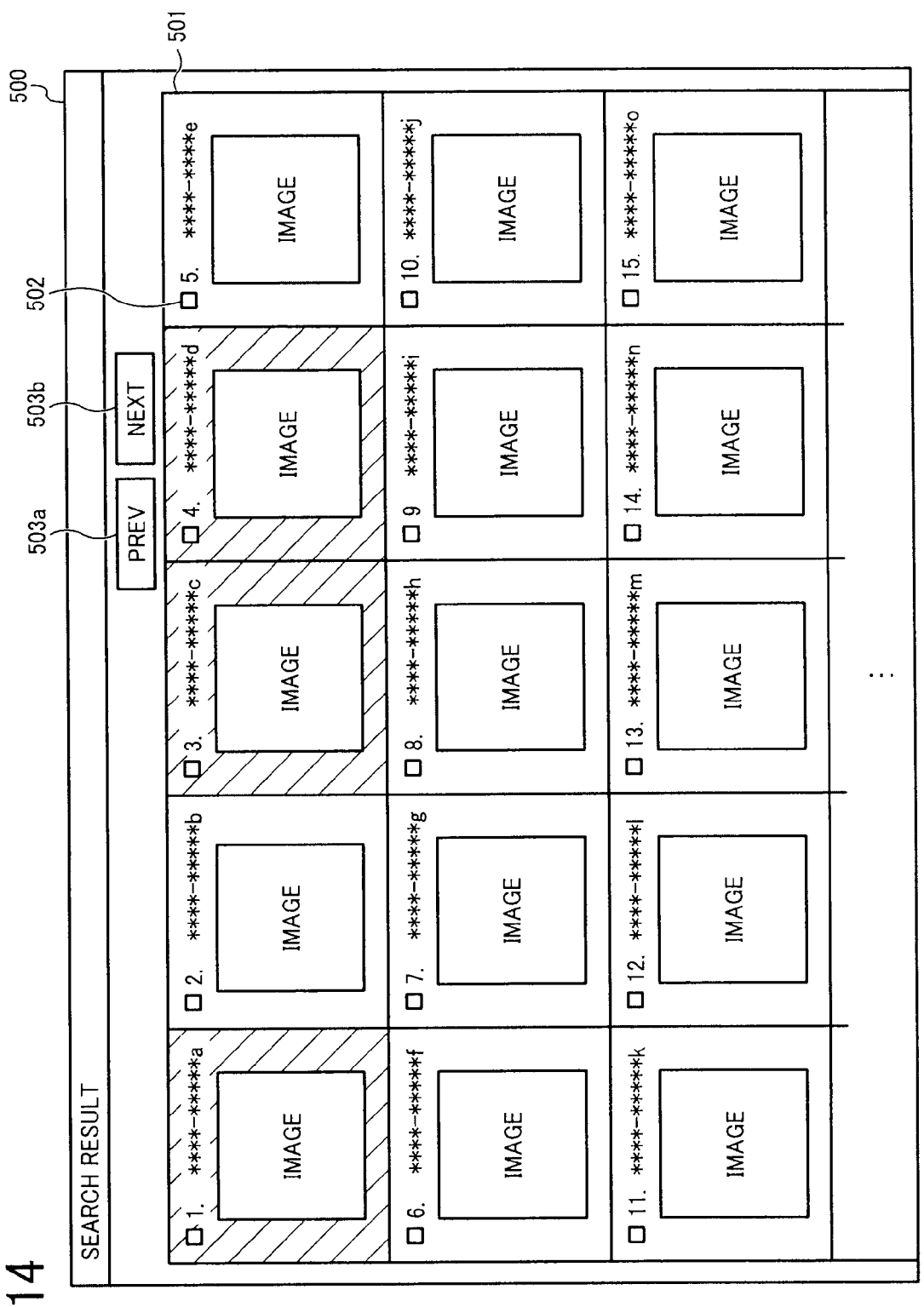
FIG. 14 is an illustration for explaining a search result screen, displayed by the client apparatus of FIG. 1, according to an example embodiment of the present invention.

In another example, the search result processor 104 may cause the client apparatus 2 to change the appearance of the image based on the display history information, which is set at S1209. For example, it is assumed that the next result display section 503b is selected to cause the client apparatus 2 to switch the display of the images from the state illustrated in FIG. 13A to the state illustrated in FIG. 13C, and the previous result display section 503a is subsequently selected to cause the client apparatus 2 to switch the display of the images from the state illustrated in FIG. 13C back to the state illustrated in FIG. 13A. In such case, the client apparatus 2 may display a search result screen 500 of FIG. 14. Referring to FIG. 14, the image 003 of the document "**-*a", the image 003 of the "-*c", and the image 004 of the document "-*d", which have been previously displayed, are displayed in shade. The image 001 of the "-***b", which is continuously displayed, is not shaded. As the image that is previously displayed to the user is displayed differently from the image that is newly obtained or the image that is continuously displayed, the user may easily recognize which one of the images has been previously displayed. In this example, the previously displayed image is displayed in shade. Alternatively, the background color of the previously displayed image may be changed. Alternatively, the document number of the document corresponding to the previously displayed image may be changed.

The search result screen 500 of FIG. 11 or 14 may be generated differently. For example, any one of the display switch section 503 and the switch lock section 502 may not be provided. In such case, the client apparatus 2 may be caused to switch the display of the search result display section 501 according to a user instruction input through the information input device 130 such as a mouse or a keyboard.

In another example, the number of images to be displayed in the search result display section 501 for each document is not limited to one as described above referring to FIG. 11 or 14. For example, more than one image may be displayed. Alternatively, all images may be displayed, for example, as a thumbnail image. In order to display the thumbnail image, a thumbnail image may be previously generated for each image data and stored in any desired storage device. Even when a plurality of images are displayed for each document, the images belonging to the same document are displayed together within the same frame provided for the document in the order determined based on the priority order information. Since a plurality of images belonging to the same document are displayed within the same frame, the user may be prevented from accessing the same document more than once.

In another example, the number of documents being displayed in one screen, or the number of images being displayed in one screen, may be changed, for example, according to a user input through the information input device 110.

In another example, in alternative to the image, the client apparatus 2 may display information regarding the image, such as the figure number, in the hyperlinked format that allows the user to access the image data upon selection of the information regarding the image.

Figure 15:
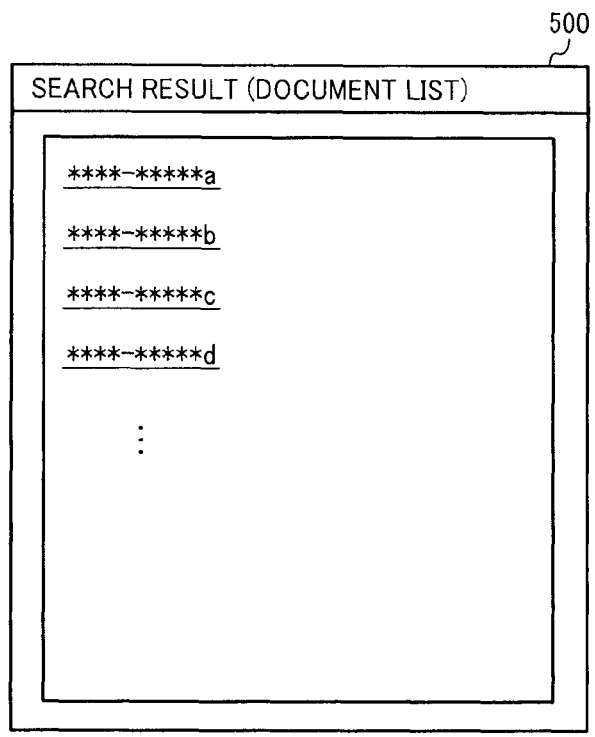
FIG. 15 is an illustration for explaining a search result screen, displayed by the client apparatus of FIG. 1, according to an example embodiment of the present invention.

Alternatively, the search result processor 104 may cause the client apparatus 2 to display a search result screen 500 of FIG. 15, which lists a plurality of documents having at least one image that is similar to the input image data. In this example illustrated in FIG. 15, the document number identifying each searched document may be hyperlinked to the corresponding document data. For example, when the document number of "**-***a" is selected by the user, the search result screen 500 of FIG. 15 may be switched to a search result screen 500 of FIG. 16.

Figure 16:
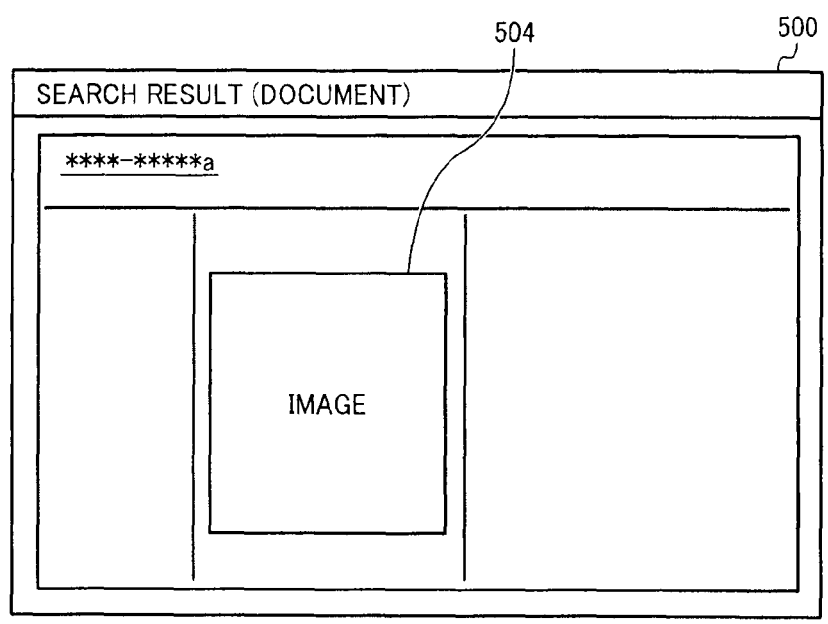
FIG. 16 is an illustration for explaining a search result screen, displayed by the client apparatus of FIG. 1, according to an example embodiment of the present invention.

Referring to FIG. 16, the search result screen 500 includes at least one image 504. The image 504 may correspond to the image having the highest image relevancy value among a plurality of images contained in the selected document. Alternatively, any number of images may be displayed, for example, in the order determined based on the image relevancy value. Alternatively, any number of images may be displayed, which has the image relevancy value equal to or greater than a threshold value.

The search result screen 500 of FIG. 16 may be additionally provided with the display switch section 503 as described above referring to FIG. 12. When the display switch section 503 is selected, the image currently displayed in the search result screen 500 may be switched to an image according to the instruction input through the display switch section 503 in a substantially similar manner as described above referring to FIG. 12. In addition to the image 504, the search result screen 500 of FIG. 16 may include any information obtainable from the selected document data, such as bibliographic data or text data obtained from the selected document data.

In this example, the operation of FIG. 4 or FIG. 12 may be performed in various other ways.

In one example, a plurality of images obtained for each document may be displayed in the order differently from the order determined by the image relevancy value. For example, the plurality of images may be displayed in the order determined by the figure number. In such case, the priority order information may be generated based on the figure number.

Further, the priority order information may be generated according to the user preference. For example, the client apparatus 2 may allow the user to select which one of the parameters is used to generate the priority order information. According to the user selection, the search result processor 104 may generate the priority order information.

In another example, S1207 may not be performed. In such case, the search result processor 104 sends the address information obtained at S1206 to the client apparatus 2. Based on the address information, the client apparatus 2 may obtain the image data for display using the address information.

In another example, any information being stored in the image database 200 or any information obtained by the information search apparatus 1 through searching may not be limited to the examples described above. For example, document information other than the document number may be stored such as document address information that locates the document data. Further, any information obtained as the image list, selected image list, image order list, etc., may not be limited to the examples described above. For example, referring back to FIG. 10, the image order list may include address information that locates the image data in alternative to the figure number of the image data.

Alternatively, the operation of FIG. 12 may be performed by the search result processor 104 provided in the client apparatus 2. The display history information memory 107 may be provided in the client apparatus 2.

Figure 17:
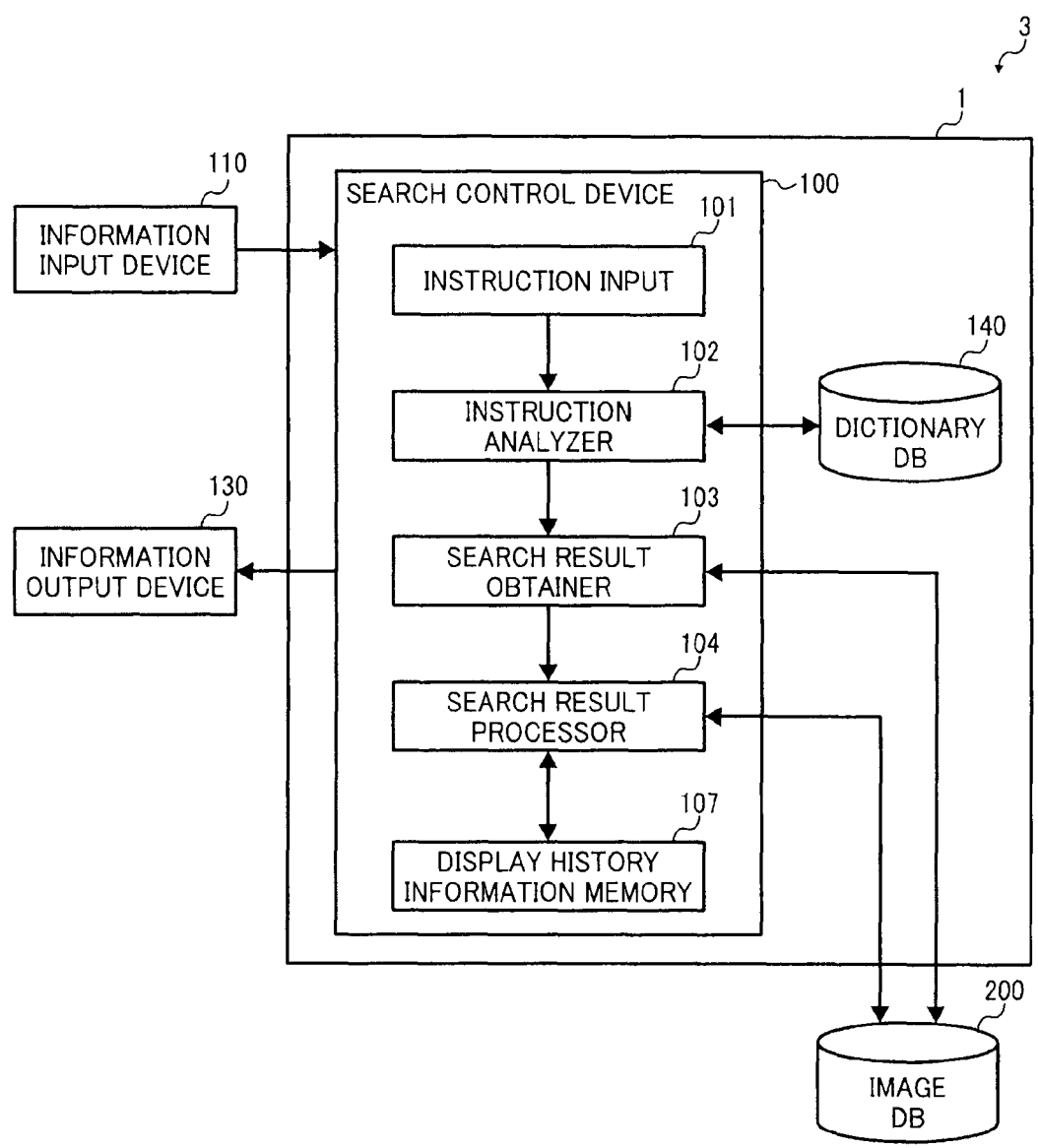
FIG. 17 is a schematic block diagram illustrating a functional structure of the information search system shown in FIG. 1, according to an example embodiment of the present invention.

Referring now to FIG. 17, a functional structure of the information search system 3 including the information search apparatus 1 is explained according to an example embodiment of the present invention. More specifically, upon loading the information search program, the information search apparatus 1 of FIG. 1 may be caused to function as the search control device 100. In addition to the search control device 100, the information search system 3 includes the information input device 110, the information output device 130, the image database 200, and a dictionary database (DB) 140.

The dictionary DB 140 stores a plurality of terms, which may be used for searching. The dictionary DB 140 may be stored in any desired memory or storage device in the information search apparatus 1 such as the HDD 40 or the RAM 20. Alternatively or additionally, the dictionary DB 140 may be stored in any desired memory or storage device available on the network, such as a server apparatus provided outside the information search apparatus 1. Alternatively or additionally, the dictionary DB 140 may be stored in any desired memory or storage device in the client apparatus 2. The dictionary DB 140 may be generated, for example, by registering a term and one or more terms that are related to the registered term.

Figure 18:
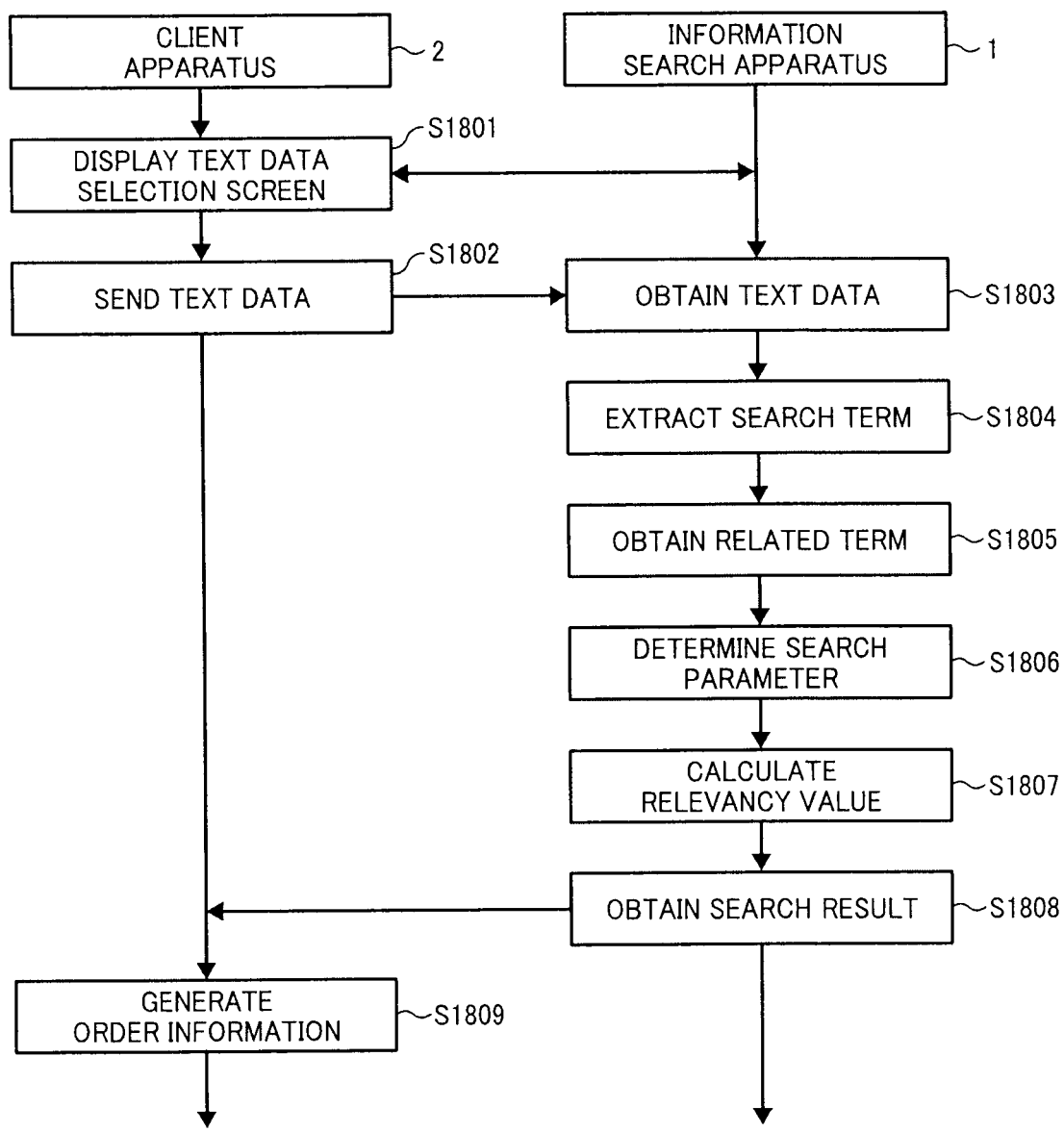
FIG. 18 is a data flow diagram illustrating operation of searching an image, performed by the information search system of FIG. 1, according to an example embodiment of the present invention.

Referring now to FIG. 18, operation of searching an image, performed by the information search system 3, is explained according to an example embodiment of the present invention. The operation of FIG. 18 may be performed in a substantially similar manner as described above referring to FIG. 4. The differences include the method of inputting a search option by the user, and the contents of the image being stored in the image database 200. In this example, the user inputs the search option in the form of text data. Further, it is assumed that the image database 200 stores a plurality of images that are each corresponding to the claims extracted from a plurality of patent application documents.

At S1801, when the client apparatus 2 receives a user instruction for searching, for example, through the browser program being installed on the client apparatus 2, the client apparatus 2 sends a request to the information search apparatus 1, which requests for information to be displayed to the user that allows the user to input a search option in the form of text data. When the request is received, the client apparatus 2 displays a text data selection screen that allows the user to input a search option in the form of text data.

Figure 19:
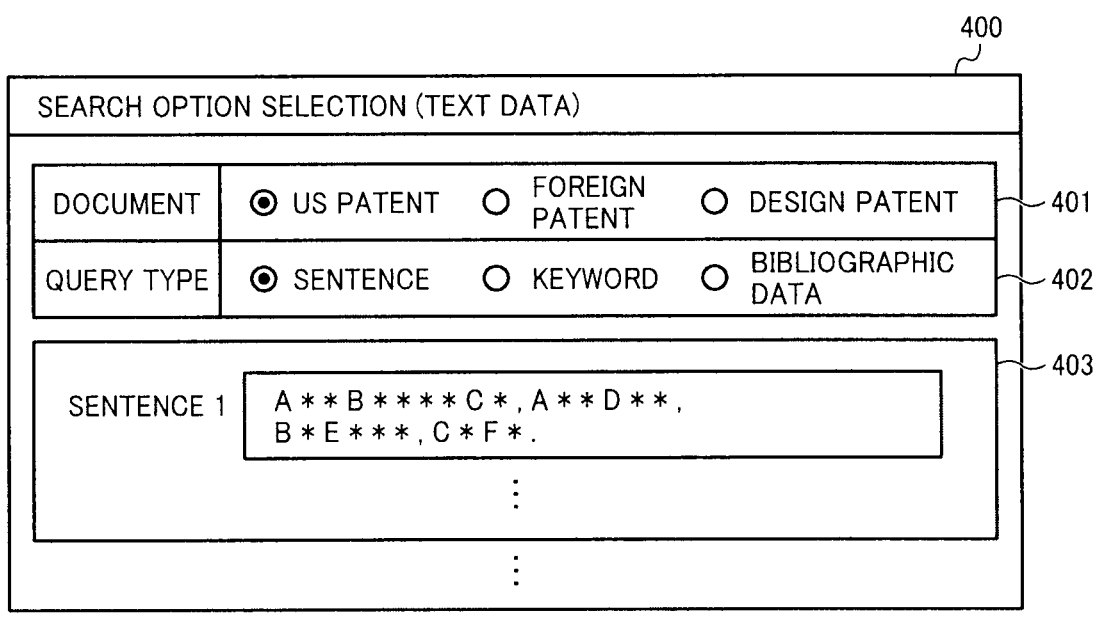
FIG. 19 is an illustration for explaining a text data selection screen, displayed by the client apparatus of FIG. 1, according to an example embodiment of the present invention.

For example, as illustrated in FIG. 19, the client apparatus 2 may display a text data selection screen 400 through the information output device 130. Referring to FIG. 19, the text data selection screen 400 includes a document selection section 401, a query selection section 402, and a query input section 403. The document selection section 401 allows the user to specify the type of a collection of documents to be searched. In this example, the user is able to select at least one of the "US PATENT", "FOREIGN PATENT", and "DESIGN PATENT". The query selection section 402 allows the user to specify how a query is input, which may be used to search an image. In this example, the user is able to select one of the "SENTENCE", "KEYWORD", and "BIBLIOGRAPHIC DATA" options. The query input section 403 allows the user to input a query according to the selected input type of the query selection section 402.

As illustrated in FIG. 19, the query input section 403 of the text data selection screen 400 may change depending on the selected input type of the query selection section 402. For example, the query input section 403 of FIG. 19 corresponds to the example case in which the "SENTENCE" option has been selected by the user as the query input type. In such case, the user may input one or more sentences. In another example, when the "KEYWORD" option is selected by the user as the query input type, the query input section 403 may allow the user to input one or more keywords. In another example, when the "BIBLIOGRAPHIC DATA" is selected as the query input type, the query input section 403 may display a list of bibliographic data available for use. Examples of bibliographic data for patent-related documents include, but not limited to, the publication number, application number, classification number, publication date, filing date, assignee name, attorney name, inventor name, related application data, and priority data.

The text data selection screen 400 may be not limited to the example case illustrated in FIG. 19. For example, the text data selection screen 400 may allow the user to input a search option using a search formula.

Referring back to FIG. 18, at S1802, the client apparatus 2 receives a search option input by the user, for example, through the text data selection screen 400 displayed at S1801. For the illustrative purpose, in this example, it is assumed that the user has selected various search options including the sentence input by the user as illustrated in FIG. 19 through the information input device 110 of the client apparatus 2. In such case, the client apparatus 2 sends information regarding the selected search option to the information search apparatus 1 through the network.

At S1803, the information search apparatus 1 receives information regarding the selected search option as a user instruction through the network I/F 120. More specifically, the instruction input 101 of the search control device 100 obtains the user instruction, and sends the user instruction to the instruction analyzer 102.

Figure 20A:
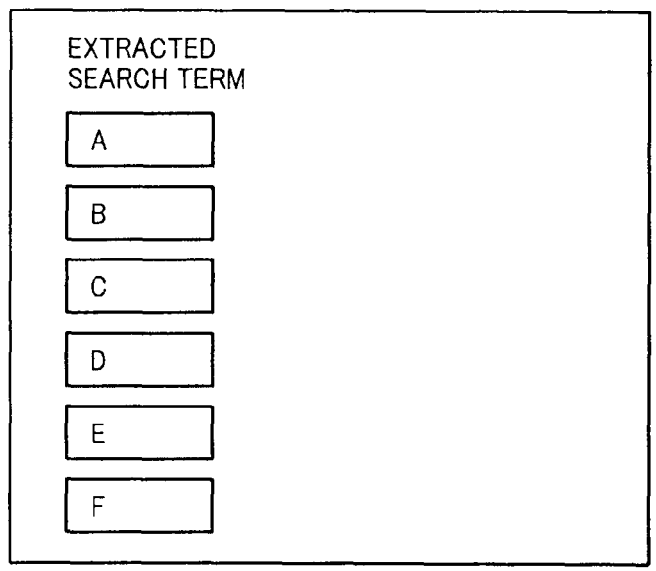
FIG. 20A is an illustration for explaining one or more extracted search terms, obtained by the information search apparatus of FIG. 1, according to an example embodiment of the present invention.

At S1804, the instruction analyzer 102 analyzes the user instruction, for example, to determine a search term to be used for searching a document. In this example, the instruction analyzer 102 analyzes the sentence input by the user, and extracts one or more terms from the sentence using the technique such as morphology analysis. The extracted search term may be stored in any desired memory such as the RAM 20. In this example, as illustrated in FIG. 20A, it is assumed that a plurality of search terms A, B, C, D, E, and F are extracted from the sentence input by the user through the text data selection screen 400 of FIG. 19. In such case, the plurality of extracted search terms A, B, C, D, E, and F may be stored in a memory, for example, in the form of table as illustrated in FIG. 20A.

Figure 20B:
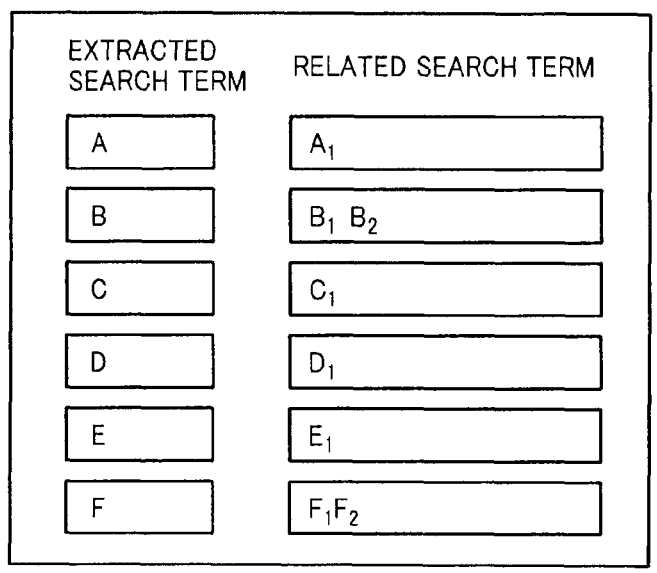
FIG. 20B is an illustration for explaining one or more related search terms, obtained by the information search apparatus of FIG. 1, according to an example embodiment of the present invention.

At S1805, the instruction analyzer 102 may further obtain, for each extracted search term, one or more related search terms that are assumed to be related to the extracted search term, for example, using the dictionary DB 140. The obtained related search term may be stored in any desired memory such as the RAM 20 for each extracted search term such that it may be used to search a document together with the extracted search term. In this example, as illustrated in FIG. 20B, it is assumed that the instruction analyzer 102 obtains a related search term A1 and a related search term A2 for the extracted search term A, a related search term B1, a related search term B2, and a related search term B3 for the extracted search term B, a related search term C1 for the extracted search term C, a related search term D1 and a related search term D2 for the extracted search term D, a related search term E1 for the extracted search term E, and a related search term F1 and a related search term F2 for the extracted search term F. In such case, the related search term that corresponds to each extracted search term extracted may be stored, for each extracted search term, for example, in the form of table as illustrated in FIG. 20B.

At S1806, the search result analyzer 102 determines search parameters to be used for searching an image, which includes the extracted search term obtained at S1804 and the related search term obtained at S1805. For simplicity, the extracted search term and related search term may be collectively referred to as the search term. The instruction analyzer 102 sends information regarding the search parameters to the search result obtainer 103.

At S1807, using the search parameters obtained from the instruction analyzer 102, the search result obtainer 103 searches the image database 200 to obtain one or more images that matches the search parameters. For example, for each image stored in the image database 200, the search result obtainer 103 obtains the term frequency indicating how frequent the search term is used in each image subjected for searching. In this example, the term frequency may be used as the relevancy value indicating the degree of relevancy of the image with respect to the search term.

In this example, the image database 200 stores information regarding the plurality of images that are stored in the image database 200, for example, in the form of image list, in a substantially similar manner as described above referring to FIG. 7. Examples of information include, but not limited to, image identification information identifying the image such as an image ID number, document information identifying the document containing the image such as a document number, claim number information regarding the number being assigned to the claim contained in the document such as a claim number, and keyword information regarding one or more terms used in the claim.

For each image obtained from the image list stored in the image database 200, the search result obtainer 103 may calculate the relevancy value of each image with respect to the search term to generate an image relevancy list in a substantially similar manner as described above referring to FIG. 8.

Referring back to FIG. 8, at S1808, the search result obtainer 103 selects a predetermined number of images from the image relevancy list based on the image relevancy value, and obtains the selected images as a search result. In this example, the images each having the relevancy value higher than a threshold value may be obtained as the search result. Further, in this example, information regarding the document from which at least one selected image is taken is obtained as the search result.

In this example, as illustrated in FIG. 21, the search result obtainer 103 may generate the search result in the form of selected image list. The selected image list includes, for each selected image, the image identification information such as the image ID number ("ID") of the image, the document information such as the document number ("DOCUMENT NO") of the document from which the image is taken, the claim number information such as the claim number ("CLAIM NO") assigned to the image, the image relevancy information such as the image relevancy value ("IMAGE RELEVANCY VALUE") of the image with respect to the search term, and address information indicating the location at which the image is stored such as path information. The search result obtainer 103 may send the search result to the search result processor 104.

Referring back to FIG. 18, at S1809, the search result processor 104 determines whether more than one selected image has been obtained from the same document. For at least two images being obtained from the same image, the search result processor 104 determines the order of displaying each image based on the image relevancy value in a substantially similar manner as described above referring to S408 of FIG. 4. For example, the search result processor 104 may generate priority order information indicating the priority order in displaying each image, and assign the priority order information to each image based on the image relevancy information of each image. Using the priority order information, the search result processor 104 may further generate an image order list of FIG. 22.

Referring to FIG. 22, the image order list includes the document information such as the document number, document relevancy information indicating the document relevancy value of each document with respect to the search term ("DOCUMENT RELEVANCY VALUE"), and the claim number information such as the claim number being assigned to each image contained in the corresponding document. For each document, the claims numbers of the selected images are arranged in the order from the image having the highest priority order to the lowest priority order.

Alternatively, the document relevancy information may not be provided. In such case, the image order list of FIG. 22 may be formed as a matrix including a row vector having a plurality of matrix elements each representing the priority order information, and a column vector having a plurality of matrix elements each representing the document. Each cell of the matrix, which is provided at the intersection of the row and the column, includes the image identification information indicating the image contained in the corresponding document that is assigned with the corresponding priority order.

Referring back to FIG. 18, at S1810, the search result processor 104 sends the search result obtained at S1808 to the client apparatus 2 through the network I/F 120 together with information regarding the priority order obtained at S1809. In this example, the search result processor 104 sends the selected image list of FIG. 21 and the image order list of FIG. 22. Alternatively, the search result processor 104 may send a portion of the search result obtained at S1808 and the information regarding the priority order obtained at S1809. For example, the search result processor 104 may send information regarding the images being assigned with the priority order having the value "1", which are to be displayed first to the user.

Figure 23:
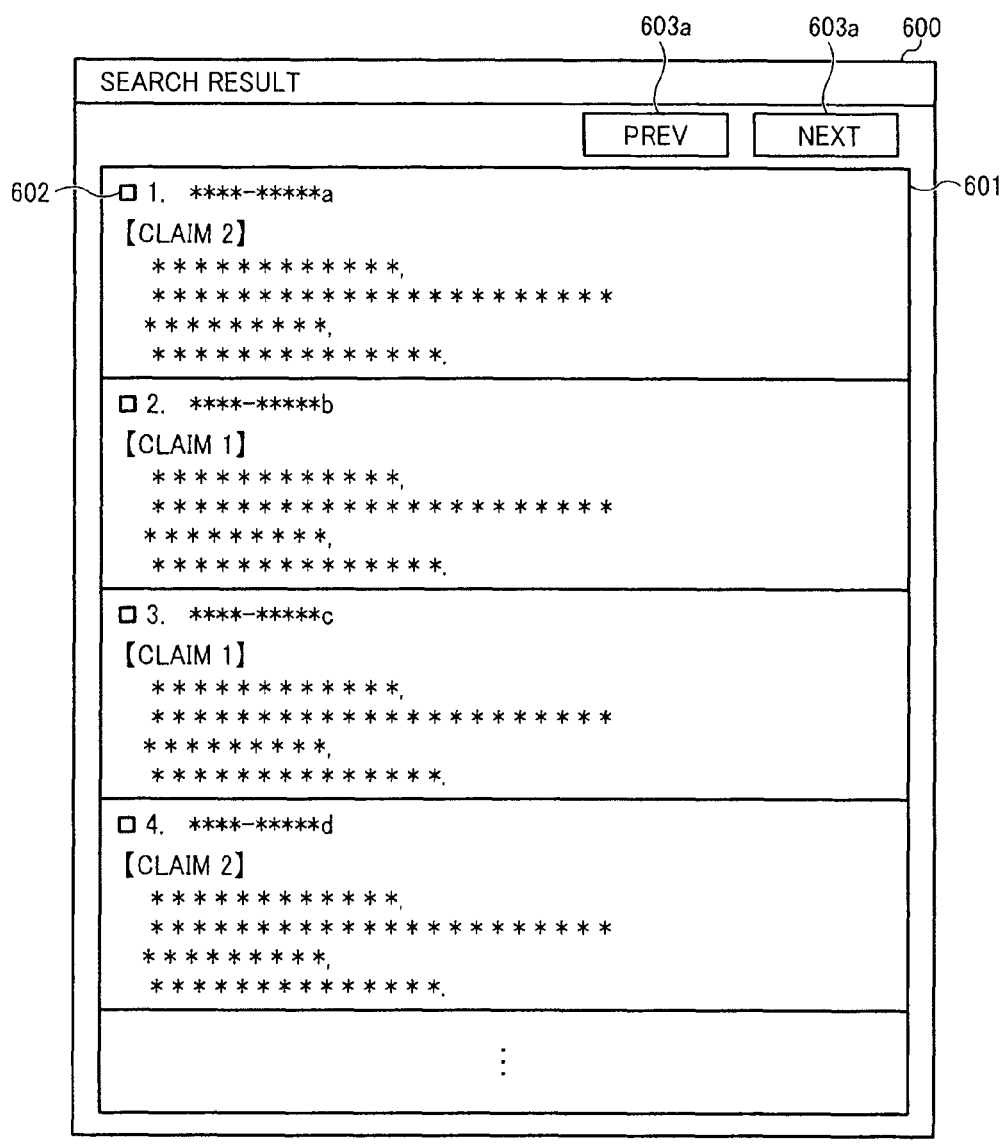
FIG. 23 is an illustration for explaining a search result screen, displayed by the client apparatus of FIG. 1, according to an example embodiment of the present invention.

At S1811, the client apparatus 2 displays the search result in the order specified by the priority order information, and the operation ends. For example, the client apparatus 2 may display a search result screen 600 illustrated in FIG. 23. The search result screen 600 of FIG. 23 includes a search result display section 601 that corresponds to the search result display section 501, a switch lock section 602 that corresponds to the switch lock section 502, a display switch section 603 that corresponds to the display switch section 503. The display switch section 603 includes a previous result display section 603a and a next result display section 603b.

The search result screen 600 or any section of the search result screen 600 may function in a substantially similar manner as described above referring to the example case illustrated in any one of FIGS. 11, 12, 13A, 13B, 13C and 14. In this example, each image displays the contents of the corresponding claim. Alternatively, the search result processor 104 may cause the client apparatus 2 to display a search result screen 600, which lists a plurality of documents having at least one image that matches the search term in a substantially similar manner as described above referring to FIG. 15. In such case, the document number identifying each searched document may be hyperlinked to the corresponding document data. For example, when one document is selected by the user from the search result screen 600, the search result screen 600 may be switched to display at least one claim that corresponds to the selected document.

The operation of FIG. 18 may be performed in various other ways, for example, as described above referring to FIG. 4.

As described above referring to FIG. 18, when a plurality of images is obtained from the same document as a search result, the plurality of images are displayed, one screen by one screen, in the order determined based on priority order information. Since one image is displayed for one document, the user may be prevented from accessing the same document more than once.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

For example, the examples described above assume that all devices of the search control device 100 are provided in the information search apparatus 1. Alternatively, any number of devices of the search control device 100 may be distributed over the network. For example, the search result processor 104 may be provided in the client apparatus 2. In such case, the information search apparatus 1 sends a search result to the client apparatus 2. The search result may include, for example, image information identifying an image that matches a search parameter obtained from a search option input by a user, image relevancy information indicating the degree of relevancy between the search parameter and the image, and document information identifying the document from which the image is obtained. The image information may correspond to any one of image identification information such as the image ID uniquely assigned to each image, figure number information such as the figure number being assigned to each image contained in the document, claim number information such as the claim number being assigned to each image contained in the document, and address information such as the path information that locates the image data.

The search result may be sent in any desired format such as in the form of table illustrated in FIG. 9 or 21. When the search result is obtained, the client apparatus 2 generates search result information based on the search result, for example, by organizing the search result into the form of list, table, or matrix, which indicates the correspondence relationship between the document and the image. The client apparatus 2 may display the search result information to the user as a search result screen.

Further, in one example, when the image that matches a search parameter includes a plurality of images being obtained from the same document, the client apparatus 2 causes a display device to display the plurality of images, one by one, in the order determined based on the priority order information assigned to each image. For example, the plurality of images belonging to the same image may be displayed, one screen by one screen, in the order determined based on the priority order information assigned to each image. In another example, the plurality of images belonging to the same image, or any desired number of the plurality of images belonging to the same image, may be displayed within the same screen, within the same frame, in the order determined based on the priority order information assigned to each image.

In this example, the priority order information may be determined based on the image relevancy information of each image. For example, the plurality of images obtained from the same document may be displayed in the order from the image having the highest image relevancy value to the image having the lowest image relevancy value.

Alternatively, the priority order information may be determined based on the order in which each image is shown in the document, which may be obtainable from image information of each image such as the figure number or claim number. For example, the plurality of images obtained from the same document may be displayed in the order from the image having the least figure number or claim number to the image having the largest figure number or claim number.

Further, in this example, when the image that matches a search parameter includes a plurality of images being obtained from the same document, the client apparatus 2 causes a display device to display the plurality of images, one by one, in the order determined based on the order in which each image is shown in the document. For example, the plurality of images belonging to the same image may be displayed, one screen by one screen, in the order determined based on the order in which each image is shown in the document, such as in the order determined by the figure number or the claim number.

Further, in this example, the image subjected for searching may include any information obtained from the source document including, for example, the figure, drawings, page, paragraph, etc. In the example case where the source document is patent-related document, the image subjected for searching may include the figure or drawings, claim, section, paragraph, page, etc.

Further, in this example, the search option input by the user may be input in any form. In one example, the search option may be input in the form of image data, for example. In another example, the search option may be input in the form of text data.

In another example, an information search apparatus may search an image including the figure that matches a user option input by a user in the form of text data. For example, the user may input a sentence through the text data selection screen of FIG. 19, as described above referring to FIG. 19. Further, the image database 200 may store, for each image, information regarding the image, such as information regarding the description of the image. For example, in the example case when a document subjected for searching is the patent application document, the description of the image may be found in the "DESCRIPTION OF THE DRAWINGS" section. The information search apparatus may determine a search term based on the search option, and search one or more images that matches the search term using information regarding the description of the image. More specifically, the information search apparatus may determine whether any drawings description section includes the search term, and obtain an image that corresponds to the drawing description section including the search term as the search result.

In another example, an information search apparatus may include: an interface to obtain a search option input by a user; a processor; and a storage device to store a plurality of instructions which causes the processor to perform search when the search option is obtained through the interface. The processor may further determine a search parameter based on the search option; search an image database to obtain an image that matches the search parameter, the image database including a plurality of images each image being obtained from one of a plurality of documents subjected for searching; generate a search result including image information identifying the image that matches the search parameter, image relevancy information indicating the degree of relevancy between the search parameter and the image, and document information identifying the document from which the image is obtained; and cause a display device to display the document information and the image being identified by the image information in a format indicating the correspondence relationship between the document information and the image. When the image that matches the search parameter includes a plurality of images being obtained from the same document, the processor may further assign priority order information to each one of the plurality of images being obtained from the same document, and cause the display device to display the plurality of images being obtained from the same document, one by one, in the order determined by the priority order information.

In the above-described example, the priority order information is assigned based on the image relevancy information. Alternatively, the priority order information may be assigned based on the order in which each image is shown in the document, which may be obtained from image information such as the figure number or claim number being assigned to the image.

In the above-described example, the processor may further cause the display device to display the plurality of images being obtained from the same document, one screen by one screen, in the order determined based on the priority order information. Alternatively, the plurality of images, or any desired number of plurality of images, may be displayed within one screen, for example, within the same frame, in the order determined based on the priority order information.

In the above-described example, the processor may further cause the display device to display a switch section together with the image being currently displayed. The switch section may be activated by a user input, and cause the display device to switch from a screen including the image being currently displayed to a screen including the image being arranged next to the image being currently displayed according to the priority order information.

In the above-described example, the processor may further cause the display device to display a lock section corresponding to the image being currently displayed. The lock section may be selected for the image being currently displayed by a user input, and cause the display device to keep displaying the image being currently displayed even when the switch section is activated.

In the above-described example, the information search apparatus may further include a storage device to store display history information indicating whether any one of the plurality of images that matches the search parameter has been displayed by the display device. The processor may further cause the display device to change the appearance of the image based on the display history information.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed is:

1. An information processing apparatus, comprising:
   an interface configured to receive a search result including image information identifying each one of a plurality of images that matches a search parameter based on a search image, image relevancy information indicating a degree of relevancy between the search parameter of the search image and each one of the plurality of images, and source data information identifying a corresponding data file from which each one of the plurality of images is obtained;
   a processor configured to determine whether the plurality of images that matches the search parameter includes a set of images obtained from a same data file, and to assign priority order information to each one of the images obtained from the same data file, the priority order information being determined based on the image relevancy information indicating the degree of relevancy between the search parameter of the search image and each one of the images obtained from the same data file; and
   a display device configured to display the set of images obtained from the same data file, one by one, in a priority order specified by the priority order information, such that only one image obtained from the same data file is displayed at a same time and such that all other images from the same data file are not displayed at said same time,
   wherein the display device is configured to display, for each data file, the set of images obtained from the same data file, one screen by one screen, in the priority order specified by the priority order information, such that one screen includes a group of images comprised of a single image from each of the different data files assigned with a same priority order, and wherein the display device is further configured such that a group of images from different data files and having a same priority order that are currently displayed are switched simultaneously to display another group of images all ranked in priority order a same one step lower or higher than the priority order of the currently displayed group of images.

2. The apparatus of claim 1, wherein the display device is configured to display, for each image being currently displayed on the screen, the source data information identifying the data file from which the set of images including the image being currently displayed is obtained, in a format indicating a correspondence relationship between the source data information and the image being currently displayed.

3. The apparatus of claim 2, wherein the processor assigns the priority order information to each one of the set of images being obtained from the same data file such that the set of images is to be displayed, one by one, in the priority order from an image thereof having a highest degree of relevancy with respect to the search parameter of the search image to an image having a lowest degree of relevancy with respect to the search parameter of the search image.

4. The apparatus of claim 2, further comprising:
a user interface configured to receive a user input from a user,
wherein the display device is further configured to display a switch section on said one screen together with the group of images from different data files having the same priority order being currently displayed, and
wherein, when the switch section is activated by the user input through the user interface, the processor obtains said another group of images arranged next to said group of images being currently displayed according to the same priority order, and causes the display device to switch from a screen including said group of images having the same priority order being currently displayed to a screen including said another group of images arranged next to said group of images having the same priority order being currently displayed.

5. The apparatus of claim 4,
wherein the display device is further configured to display a lock section on said one screen corresponding to said group of images having the same priority order being currently displayed, and
wherein, for each of the images of said group of images having the same priority order, when the lock section is selected by the user input through the user interface to lock the image being currently displayed, the processor causes the display device to keep displaying the locked image being currently displayed even when the switch section is activated.

6. The apparatus of claim 2, further comprising:
a storage device configured to store display history information indicating whether any one of the plurality of images that matches the search parameter has been displayed by the display device, wherein the processor is further configured to:
cause the display device to change an appearance of the previously displayed images based on the display history information.

7. An information search system, comprising:
a storage device configured to store a plurality of images, each image being obtained from a portion of one of a plurality of data files subjected for searching based on a search image;
an information processing apparatus configured to send a search option input by a user for the search image; and
an information search apparatus coupled to the information processing apparatus via a network and configured to:
determine a search parameter based on the search option input by the user for the search image;
search the storage device to obtain a plurality of images that matches the search parameter based on the search image; and
send a search result to the information processing apparatus, the search result including image information identifying each one of the plurality of images that matches the search parameter based on the search image, image relevancy information indicating a degree of relevancy between the search parameter of the search image and each one of the plurality of images, and source data information identifying a corresponding data file from which each one of the plurality of images is obtained,
wherein the information processing apparatus is further configured to determine whether the plurality of images that matches the search parameter includes a set of images obtained from the same data file, to assign priority order information to each one of the images obtained from the same data file, the priority order information being determined based on the image relevancy information indicating the degree of relevancy between the search parameter of the search image and each one of the images obtained from the same data file, and to display through a display device the set of images obtained from the same data file, one by one, in a priority order specified by the priority order information, such that only one image obtained from the same data file is displayed at a same time and such that all other images from the same data file are not displayed at said same time,
wherein the display device is configured to display, for each data file, the set of images obtained from the same data file, one screen by one screen, in the priority order specified by the priority order information, such that one screen includes a group of images comprised of a single image from each of the different data files assigned with a same priority order, and
wherein the display device is further configured such that a group of images from different data files and having the same priority order that are currently displayed are switched simultaneously to display another group of images all ranked in priority order a same one step lower or higher than the priority order of the currently displayed group of images.

8. The system of claim 7, wherein the information processing apparatus is further configured to:
display, for each image being currently displayed on the screen, the source data information identifying the data file from which the set of images including the image being currently displayed is obtained, in a format indicating a correspondence relationship between the source data information and the image being currently displayed.

9. The system of claim 8, wherein,
the information processing apparatus is further configured to display a switch section on said one screen together with said group of images from different data files having the same priority order being currently displayed, and the switch section being configured to be activated by a user input received through the information processing apparatus, and to cause the information processing apparatus to obtain said another group of images arranged next to said group of images being currently displayed according to the same priority order, and switch from a screen including said group of images from different data files having the same priority order being currently displayed to a screen including said another group of images arranged next to said group of images from different data files having the same priority order being currently displayed.

10. The system of claim 9,
wherein the information processing apparatus is further configured to display a lock section on said one screen corresponding to said group of images from different data files having the same priority order being currently displayed, and
wherein, for each of the images of said group of images having the same priority order, when the lock section is selected by the user input received through the information processing apparatus to lock the image being currently displayed, the information processing apparatus keeps displaying the locked image being currently displayed even when the switch section is activated.

11. The system of claim 8, further comprising:
a storage device configured to store display history information indicating whether any one of the plurality of images that matches the search parameter has been displayed by the information processing apparatus,
wherein, the information processing apparatus is further configured to change an appearance of the previously displayed images based on the display history information.

12. The system of claim 7, further comprising:
a scanner apparatus configured to scan a paper document into image data and to output the image data to the information search apparatus as a basis for the search parameter.

13. An information search method, comprising:
storing a plurality of images in a storage device, each image being obtained from a portion of one of a plurality of data files subjected for searching based on a search image;
determining a search parameter based on a search option input by a user for the search image;
searching the storage device to obtain a plurality of images that matches the search parameter based on the search image;
generating a search result including image information identifying each one of the plurality of images that matches the search parameter based on the search image, image relevancy information indicating a degree of relevancy between the search parameter of the search image and each one of the plurality of images, and source data information identifying a corresponding data file from which each one of the plurality of images is obtained;
determining whether the plurality of images that matches the search parameter includes a set of images obtained from the same data file;
assigning priority order information to each one of the images obtained from the same data file, the priority order information being determined based on the image relevancy information indicating the degree of relevancy between the search parameter of the search image and each one of the images obtained from the same data file; and displaying through a display device the set of images obtained from the same data file, one by one, in a priority order specified by the priority order information, such that only one image obtained from the same data file is displayed at a same time and such that all other images from the same data file are not displayed at said same time,
wherein the display device is configured to display, for each data file, the set of images obtained from the same data file, one screen by one screen, in the priority order specified by the priority order information, such that one screen includes a group of images comprised of a single image from each of the different data files assigned with a same priority order, and
wherein the display device is further configured such that a group of images from different data files and having a same priority order that are currently displayed are switched simultaneously to display another group of images all ranked in priority order a same one step lower or higher than the priority order of the currently displayed group of images.

14. The method of claim 13, further comprising:
displaying, for each image being currently displayed on the screen, the source data information identifying the data file from which the set of images including the image being currently displayed is obtained, in a format indicating a correspondence relationship between the source data information and the image being currently displayed.

15. The method of claim 14, further comprising:
displaying a switch section on said one screen together with said group of images from different data files and having the same priority order being currently displayed;
obtaining said another group of images arranged next to said group of images being currently displayed according to the same priority order, when the switch section is activated by a user input; and
switching from a screen including said group of images having the same priority order being currently displayed to a screen including said another group of images arranged next to said group of images having the same priority order being currently displayed, when the switch section is activated by the user input.

16. The method of claim 15, further comprising:
displaying a lock section on said one screen corresponding to said group of images having the same priority order being currently displayed; and
for each of the images of said group of images having the same priority order, keeping display of a locked image being currently displayed when the lock section is selected for the locked image being currently displayed by the user input even when the switch section is activated.

17. The method of claim 14, further comprising:
storing display history information indicating whether any one of the plurality of images that matches the search parameter has been displayed by the display device; and
changing an appearance of the previously displayed images based on the display history information.

18. A non-transitory computer-readable medium storing a plurality of instructions thereon, the instructions configured to perform a search method when executed by a processor, the search method comprising:

storing a plurality of images in a storage device, each image being obtained from a portion of one of a plurality of data files subjected for searching based on a search image;

determining a search parameter based on a search option input by a user for the search image;

searching the storage device to obtain a plurality of images that matches the search parameter based on the search image;

generating a search result including image information identifying each one of the plurality of images that matches the search parameter based on the search image, image relevancy information indicating a degree of relevancy between the search parameter of the search image and each one of the plurality of images, and source data information identifying corresponding data file from which each one of the plurality of images is obtained;

determining whether the plurality of images that matches the search parameter includes a set of images obtained from the same data file;

assigning priority order information to each one of the images obtained from the same data file, the priority order information being determined based on the image relevancy information indicating the degree of relevancy between the search parameter of the search image and each one of the images obtained from the same data file; and displaying through a display device the set of images obtained from the same data file, one by one, in a priority order specified by the priority order information, such that only one image obtained from same data file is displayed at a same time and such that all other images from the same file are not displayed at said same time, wherein the display device is configured to display, for each data file, the set of images obtained from the same data file, one screen by one screen, in the priority order specified by the priority order information, such that one screen includes a group of images comprised of a single image from each of the different data files assigned with a same priority order, and wherein the display device is further configured such that a group of images from different data files and having a same priority order that are currently displayed are switched simultaneously to display another group of images all ranked in priority order a same one step lower or higher than the priority order of the currently displayed group of images.

* * * * *